(12) United States Patent
Nezu et al.

(10) Patent No.: US 10,503,358 B2
(45) Date of Patent: Dec. 10, 2019

(54) VEHICLE-MOUNTED APPARATUS, INFORMATION PROVIDING METHOD FOR USE WITH VEHICLE-MOUNTED APPARATUS, AND RECORDING MEDIUM RECORDED INFORMATION PROVIDING METHOD PROGRAM FOR USE WITH VEHICLE-MOUNTED APPARATUS THEREIN

(71) Applicant: Sony Corporation, Tokyo (JP)

(72) Inventors: Yoshiyuki Nezu, Tokyo (JP); Tomoaki Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 398 days.

(21) Appl. No.: 14/496,740

(22) Filed: Sep. 25, 2014

(65) Prior Publication Data

US 2015/0012941 A1 Jan. 8, 2015

Related U.S. Application Data

(63) Continuation of application No. 13/887,162, filed on May 3, 2013, now Pat. No. 9,285,955, which is a
(Continued)

(30) Foreign Application Priority Data

May 31, 2004 (JP) .................................. 2004-160528

(51) Int. Cl.
*G06F 3/0482* (2013.01)
*B60K 35/00* (2006.01)
(Continued)

(52) U.S. Cl.
CPC ............ *G06F 3/0482* (2013.01); *B60K 35/00* (2013.01); *B60K 37/06* (2013.01); *G06F 3/017* (2013.01);
(Continued)

(58) Field of Classification Search
CPC .... G06F 3/0482; G06F 3/017; G06F 3/04817; G06F 3/0484; G06F 3/0485; G06F 3/0488
See application file for complete search history.

(56) References Cited

U.S. PATENT DOCUMENTS

| 4,532,605 A | 7/1985 | Waller |
| 5,467,444 A | 11/1995 | Kawamura et al. |

(Continued)

FOREIGN PATENT DOCUMENTS

| DE | 197 53 742 A1 | 6/1999 |
| EP | 1 081 669 A2 | 3/2001 |

(Continued)

OTHER PUBLICATIONS

Japanese Office Action dated Jul. 12, 2011, in Patent Application No. 2004-160528.

(Continued)

*Primary Examiner* — Anil K Bhargava
(74) *Attorney, Agent, or Firm* — Xsensus, LLP

(57) ABSTRACT

A vehicle-mounted apparatus is disclosed which includes a displaying unit for providing information to a user, an inputting unit for inputting operations carried out by the user, and a controlling unit for controlling a display of the displaying unit based on the operations input through the inputting unit. The inputting unit has at least a touch-sensitive panel attached to a display screen of the displaying unit. The controlling unit causes the displaying unit to display a menu screen based on the operations input through the inputting unit. The controlling unit also causes the displaying unit to switch the displays based on menus selected on the menu screen. Furthermore, the controlling unit causes the displaying unit to switch, as when a specific menu is selected on the menu screen, the displays in
(Continued)

response to a fingertip gesture made by the user for detection on the touch-sensitive panel.

25 Claims, 16 Drawing Sheets

Related U.S. Application Data continuation of application No. 12/881,872, filed on Sep. 14, 2010, now Pat. No. 8,458,618, which is a continuation of application No. 11/133,344, filed on May 20, 2005, now Pat. No. 8,151,210.

(51) Int. Cl.
| | | |
|---|---|---|
| *B60K 37/06* | (2006.01) | |
| *G06F 3/0488* | (2013.01) | |
| *G06F 3/01* | (2006.01) | |
| *G06F 3/0484* | (2013.01) | |
| *G06F 3/0481* | (2013.01) | |
| *G06F 3/0485* | (2013.01) | |
| *H04N 21/478* | (2011.01) | |

(52) U.S. Cl.
CPC ......... *G06F 3/0484* (2013.01); *G06F 3/0485* (2013.01); *G06F 3/0488* (2013.01); *G06F 3/04817* (2013.01); *G06F 3/04883* (2013.01); *H04N 21/478* (2013.01); *B60K 2370/11* (2019.05); *B60K 2370/143* (2019.05)

(56) References Cited

U.S. PATENT DOCUMENTS

| 5,638,523 | A | 6/1997 | Mullet et al. | |
|---|---|---|---|---|
| 5,710,600 | A | 1/1998 | Ishii et al. | |
| 6,157,372 | A | 12/2000 | Blackburn et al. | |
| 6,275,231 | B1 | 8/2001 | Obradovich | |
| 6,313,853 | B1* | 11/2001 | Lamontagne | G06F 9/451 |
| | | | | 715/762 |
| 6,335,745 | B1* | 1/2002 | Amro | G06F 3/0481 |
| | | | | 715/781 |
| 6,484,094 | B1 | 11/2002 | Wako | |
| 6,542,812 | B1 | 4/2003 | Obradovich et al. | |
| 7,084,859 | B1* | 8/2006 | Pryor | G01C 21/3664 |
| | | | | 345/156 |
| 2002/0030667 | A1* | 3/2002 | Hinckley | C08F 236/12 |
| | | | | 345/173 |
| 2002/0062484 | A1* | 5/2002 | De Lange | H04N 5/44513 |
| | | | | 725/105 |
| 2002/0082730 | A1* | 6/2002 | Capps | H04N 21/40 |
| | | | | 700/94 |
| 2003/0210286 | A1 | 11/2003 | Gerpheide et al. | |
| 2004/0212586 | A1* | 10/2004 | Denny, III | G06F 1/1626 |
| | | | | 345/156 |
| 2004/0252120 | A1* | 12/2004 | Hunleth | G06F 3/0482 |
| | | | | 345/440 |
| 2005/0166136 | A1* | 7/2005 | Capps | H04N 21/40 |
| | | | | 715/202 |
| 2005/0212754 | A1* | 9/2005 | Marvit | G06F 1/1626 |
| | | | | 345/156 |
| 2009/0171580 | A1 | 7/2009 | Nezu | |
| 2009/0172599 | A1 | 7/2009 | Nezu | |

FOREIGN PATENT DOCUMENTS

| JP | 01 014974 A | 1/1989 |
|---|---|---|
| JP | 64-14974 | 1/1989 |
| JP | 6-242885 | 9/1994 |
| JP | 07-230374 | 8/1995 |
| JP | 9-257499 | 10/1997 |
| JP | 9-292830 | 11/1997 |
| JP | 11 085398 A | 3/1999 |
| JP | 11-8539810 | 3/1999 |
| JP | 2001-005599 | 1/2001 |
| JP | 2001-41756 | 2/2001 |
| JP | 2001-265481 | 9/2001 |
| JP | 2002-296051 | 10/2002 |
| JP | 2002-303518 | 10/2002 |
| JP | 2003-166843 | 6/2003 |
| JP | 2003-344087 | 12/2003 |
| JP | 2004028646 A * | 1/2004 |
| WO | WO 02/25420 A1 | 3/2002 |

OTHER PUBLICATIONS

European Search Report dated Jan. 11, 2012 in Patent Application No. 05011728.2.
Office Action dated Sep. 20, 2011 in Japanese Patent Application No. 2010-023457.
European Office Action dated Aug. 20, 2012 in European Patent Application No. 05 011 728.2-1229.
Communication pursuant to Article 94(3) EPC dated Mar. 14, 2018 in Patent Application No. 05 011 728.2.

* cited by examiner

FIG. 5

| MENU/NAVIGATION | | |
|---|---|---|
| DESTINATION | SEARCH FOR SURROUNDING FACILITIES | ENTERTAINMENT |
| | SEARCH BY NAME (ALPHABETIZED) | SIGHTSEEING AND ACCOMMODATIONS |
| LOCATION | SEARCH BY ADDRESS | CARS AND TRAFFIC |
| INFORMATION | SEARCH BY TELEPHONE NO. | EATERY |
| SETTINGS | SEARCH BY GENRE | SHOPPING |
| | SEARCH BY PERSONAL NAME | CULTURE |
| SET-UP | SEARCH BY MARKING | PUBLIC AND LIFESTYLE INFORMATION |
| END | SEARCH BY LONGITUDE AND LATITUDE | |

FIG. 7A
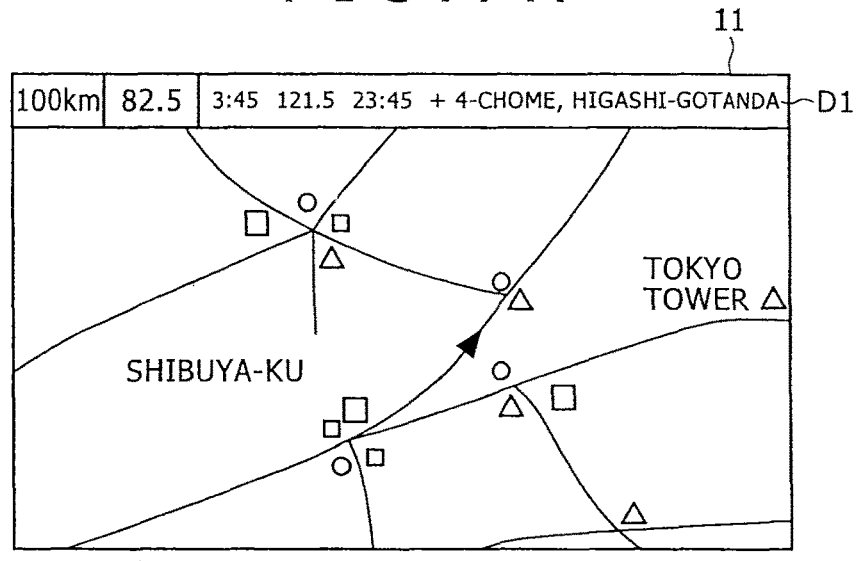
FIG. 7B1        FIG. 7B2
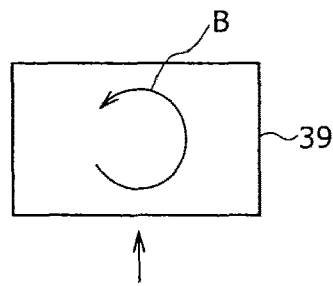 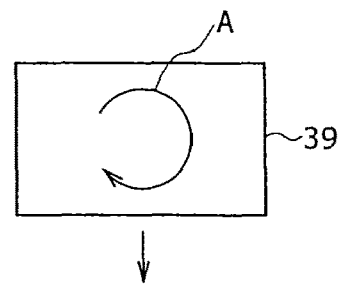
FIG. 7C
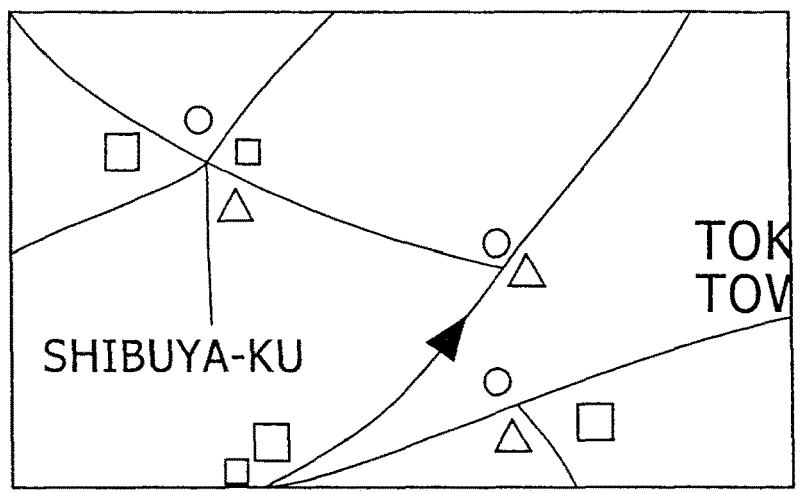

FIG.9A
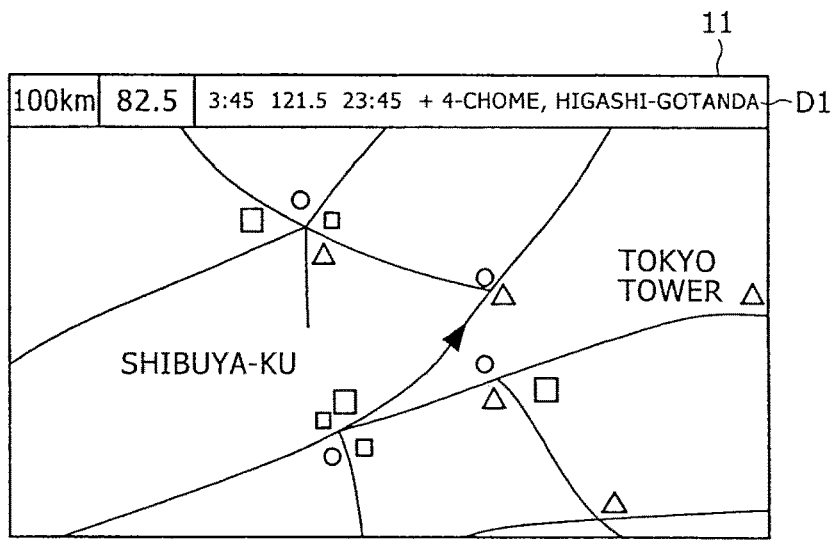
FIG.9B1
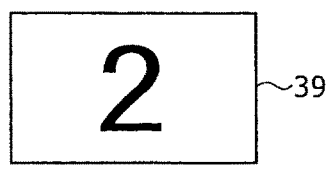
FIG.9B2
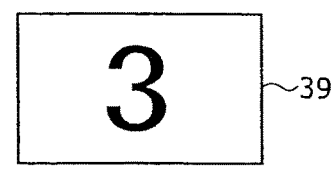
FIG.9C
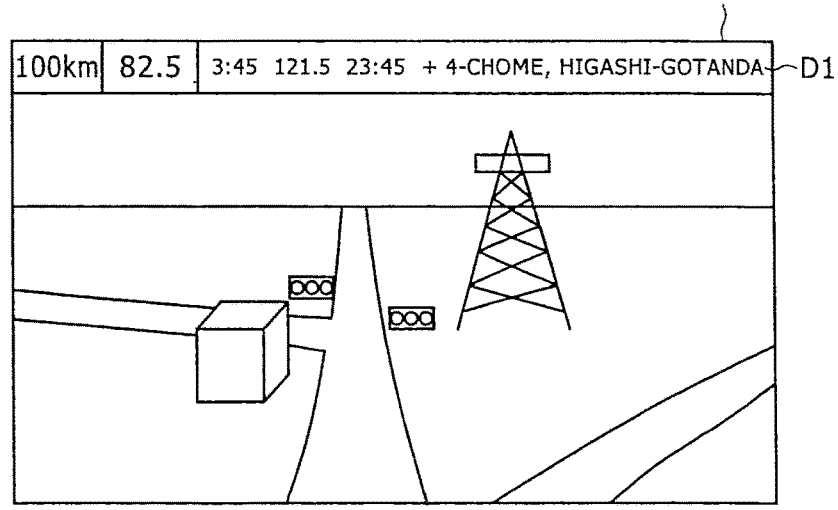

VEHICLE-MOUNTED APPARATUS, INFORMATION PROVIDING METHOD FOR USE WITH VEHICLE-MOUNTED APPARATUS, AND RECORDING MEDIUM RECORDED INFORMATION PROVIDING METHOD PROGRAM FOR USE WITH VEHICLE-MOUNTED APPARATUS THEREIN

CROSS REFERENCE

This application is a continuation of and is based upon and claims the benefit of priority under 35 U.S.C. § 120 for U.S. Ser. No. 13/887,162, filed May 3, 2013 which is a continuation of Ser. No. 12/881,872, filed Sep. 14, 2010 (now U.S. Pat. No. 8,458,618), which is a continuation of U.S. Ser. No. 11/133,344, filed May 20, 2005 (now U.S. Pat. No. 8,151,210), the entire contents of which are incorporated herein by reference and claims the benefit of priority under 35 U.S.C. § 119 from Japanese Patent Application No. 2004-160528, filed May 31, 2004.

BACKGROUND OF THE INVENTION

The present invention relates to a vehicle-mounted apparatus, an information providing method for use with the vehicle-mounted apparatus, and an information providing method program for use with the vehicle-mounted apparatus. More particularly, the invention relates to a vehicle-mounted apparatus which has navigation and content reproduction capabilities and which is structured to have its displays switched in menu-based fashion upon input of fingertip gestures made by a user on a touch-sensitive panel, whereby the user's ease of operation is enhanced.

In the past, some vehicle-mounted car navigation apparatuses were designed to display hierarchically structured menus that were selected by manual input through a touch-sensitive panel or the like, as disclosed illustratively in Japanese Patent Laid-open No. Hei 10-141974. Vehicle-mounted car navigation apparatuses of another type such as one disclosed in Japanese Patent Laid-open No. Hei 11-85398 were designed to admit the input of line drawings through a touch-sensitive panel.

Recent years have seen vehicle-mounted apparatuses of yet another type proposed which have their navigation capabilities supplemented with audio and video reproduction functions. These vehicle-mounted apparatus are characterized by an excellent space-saving feature. they take up far less space than a car navigation device, a car audio device and other equipment mounted individually on the vehicle.

However, the above type of vehicle-mounted apparatus typically presents the user with a baffling array of elaborate information displays and complicated operations to perform. These navigation-related operations and information displays are compounded with those for audio and video content reproduction. The resulting complex user interface can multiply the operational burdens on the user. Specifically, because of their beefed-up functionality, hierarchically structured menu displays entail a growing number of menu-related hierarchical operations that need to be carried out manually, leading to an appreciable drop in the user's ease of operation. The simple function of displaying such menus involves complications in the manner in which the display screens are structured, also contributing to the worsening ease of use. In particular, the manner of inputting commands using line drawings as proposed by Japanese Patent Laid-open No. Hei 11-85398 can result in an abruptly spiked operational burden on the user because the functional improvements involved require more and more line drawings to be entered.

SUMMARY OF THE INVENTION

The present invention has been made in view of the above circumstances and proposes a vehicle-mounted apparatus, an information providing method for use with the vehicle-mounted apparatus, and an information providing method program for use with the vehicle-mounted apparatus with a view to improving the user's ease of operation.

According to a first embodiment of the present invention, there is provided a vehicle-mounted apparatus including: a displaying device for providing desired information to a user; an inputting device for inputting operations carried out by the user; and a controlling device for controlling a display of the displaying device based on the operations input through the inputting device; wherein the inputting device has at least a touch-sensitive panel attached to a display screen of the displaying device; and wherein the controlling device causes the displaying device to display a menu screen based on the operations input through the inputting device, the controlling device further causing the displaying device to switch the displays based on menus selected on the menu screen, the controlling device further causing the displaying device to switch, as when a specific menu is selected on the menu screen, the displays in response to a fingertip gesture made by the user for detection on the touch-sensitive panel.

According to a second embodiment of the present invention, there is provided an information providing method for use with a vehicle-mounted apparatus which provides desired information to a user through a displaying device, the information providing method including the steps of displaying a menu screen on the displaying device based on input through an inputting device of the apparatus; switching displays on the displaying device based on menus selected on the menu screen; and switching, as when a specific menu is selected on the menu screen, the displays on the displaying device in response to a fingertip gesture made by the user for detection on a touch-sensitive panel attached to a display screen of the displaying device.

According to a third embodiment of the present invention, there is provided a recording medium recorded an information providing method program for use with a vehicle-mounted apparatus therein which provides desired information to a user through a displaying device, the information providing method program including the steps of displaying a menu screen on the displaying device based on input through an inputting device of the apparatus; switching displays on the displaying device based on menus selected on the menu screen; and switching, as when a specific menu is selected on the menu screen, the displays on the displaying device in response to a fingertip gesture made by the user for detection on a touch-sensitive panel attached to a display screen of the displaying device.

Where the vehicle-mounted apparatus according to the first embodiment of this invention is in use, the displaying device displays the menu screen based on what is input through the inputting unit. Displays are switched on the displaying unit in keeping with menus selected on the menu screen. As when a particular menu is selected on the menu screen, the displays are switched on the displaying device in response to a fingertip gesture made by the user for detection on the touch-sensitive panel. That is, a single gesture is sufficient for displaying the menu screen and executing a display switchover-operations accomplished traditionally by selecting menus on the menu screen. The setup contributes to improving the user's ease of operation by reducing the number of operations to be performed by the user and by alleviating the user's need to rely on his or her memorized operating procedures. Because there is no need to display menus on the display screen, complexities on the display screen are diminished, which also adds to the user's ease of operation.

Where the method and program according to the second and the third embodiments of this invention are used in combination with the apparatus of the first embodiment, the user's ease of operation is further enhanced.

According to the present invention, as described above, fingertip gestures made on the touch-sensitive panel are accepted to implement display switchovers, whereby the user's ease of operation is improved.

Because appropriate fingertip gestures bring about the display switchovers envisaged by the user, anyone who has little familiarity with apparatus operations can switch displays easily and unfailingly.

Because the display switchovers carried out as envisaged by the user actually implement display screen switchovers, the novice user can get a child screen displayed, a 2-D display called up, or other display switchovers executed with ease and reliability.

When the display switchovers effected as envisaged by the user actually implement display screen transitions, the user who is not familiar with apparatus operations can still get the child screen hidden from view, have what is displayed switched between the child and the parent screens, or get other display switchovers implemented easily and unfailingly.

That is, when the display switchovers executed as described above provide changes of map display or reproduced content display, the inventive apparatus further adds to the user's ease of operation.

Although the present invention has been shown applied to the vehicle-mounted apparatus with both content reproduction and car navigation capabilities, this is not limitative of the invention. Alternatively, the invention can be applied extensively to vehicle-mounted apparatuses providing either content reproduction or car navigation capabilities only.

Other objects, features and advantages of the invention will become more apparent upon a reading of the following description and appended drawings.

BRIEF DESCRIPTION OF THE DRAWINGS

FIG. 5 is a plan view explaining a menu for a main screen of FIG. 4;

FIGS. 7A, 7B1, 7B2, and 7C are plan views explaining how a map is magnified and reduced in scale;

FIGS. 9A, 9B1, 9B2, and 9C are plan views explaining how two-dimensional and three-dimensional displays are switched;

DETAILED DESCRIPTION OF THE PREFERRED EMBODIMENTS

A preferred embodiment of the present invention will now be described with reference to the accompanying drawings.

Figure 1:
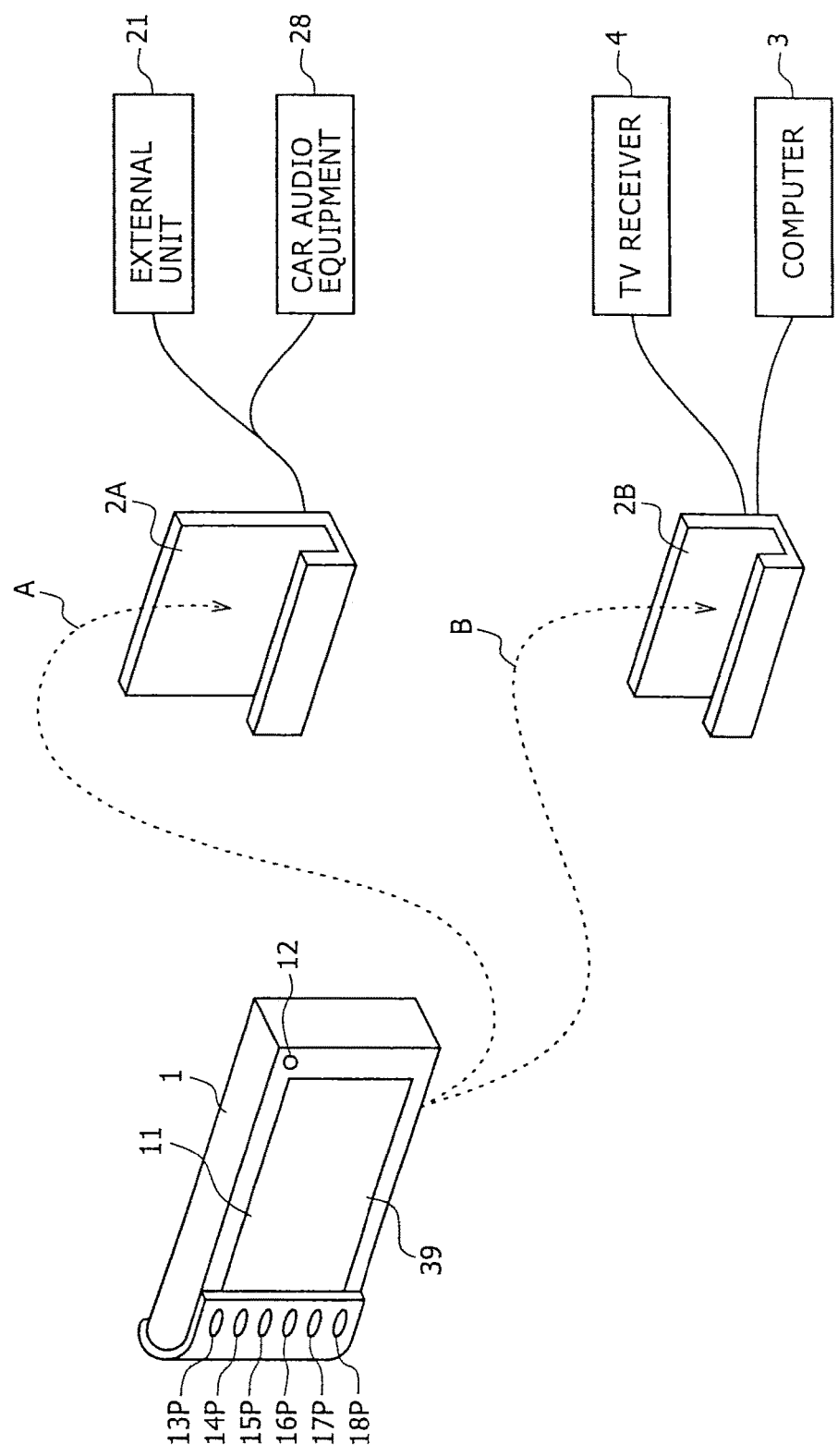
FIG. 1 is a perspective view of a vehicle-mounted apparatus together with its related structures according to an embodiment of this invention.

(1) Structure of the Embodiment (1-1) Overall Structure of the Vehicle-Mounted Apparatus FIG. 1 is a perspective view of a vehicle-mounted apparatus 1 constituting a content providing system embodying this invention. The vehicle-mounted apparatus 1 is a multimedia terminal that functions both as a car navigation device and as a content providing device capable of audio and video reproduction. The apparatus is a board-shaped unit with a certain thickness. As indicated by an arrow A, the apparatus 1 is set upon use into an onboard cradle 2A attached to the center console of the vehicle.

With the use of a cradle taken into account, the vehicle-mounted apparatus 1 has terminals and ports furnished on its underside for data input and output and for other purposes. When placed into the onboard cradle 2A, the apparatus 1 is powered through its underside terminals plugged into the cradle. When thus installed and powered, the vehicle-mounted apparatus 1 permits input and output of diverse kinds of data.

The vehicle-mounted apparatus 1 may be detached from the onboard cradle 2A and brought illustratively to the user's household. In that case, as indicated by an arrow B, the apparatus 1 may be placed into a home cradle 2B through which the apparatus is connected to a computer 3 and a TV receiver 4.

During connection with the computer 3 via the home cradle 2B, the vehicle-mounted apparatus 1 is used as a multimedia terminal for uploading and downloading various files. The computer 3 starts up an application program compatible with the vehicle-mounted apparatus 1. The application program thus activated allows the computer 3 to upload and download files to and from the apparatus 1 via the home cradle 2B. These files include audio and video content files, electronic mail files, and map files for navigation purposes. The AV content files are made up of movie and TV program files as well as music files.

During connection with the TV receiver 4 via the home cradle 2B, the vehicle-mounted apparatus 1 is used as a multimedia terminal for presenting the user with diverse kinds of content on a TV screen. In addition, the apparatus 1 may carry out its car navigation functions such as searches for routes while displaying maps on the TV receiver 4.

When placed on board the vehicle, the vehicle-mounted apparatus 1 has a display screen 11 oriented to the front, the screen displaying content and other information. In the top right corner of the display screen 11 is a power switch 12. On the left of the display screen 11 is a control panel equipped with controls 13P through 18P arranged from the top down to perform source, program, menu, display, map, and audio volume adjustments respectively.

Figure 2:
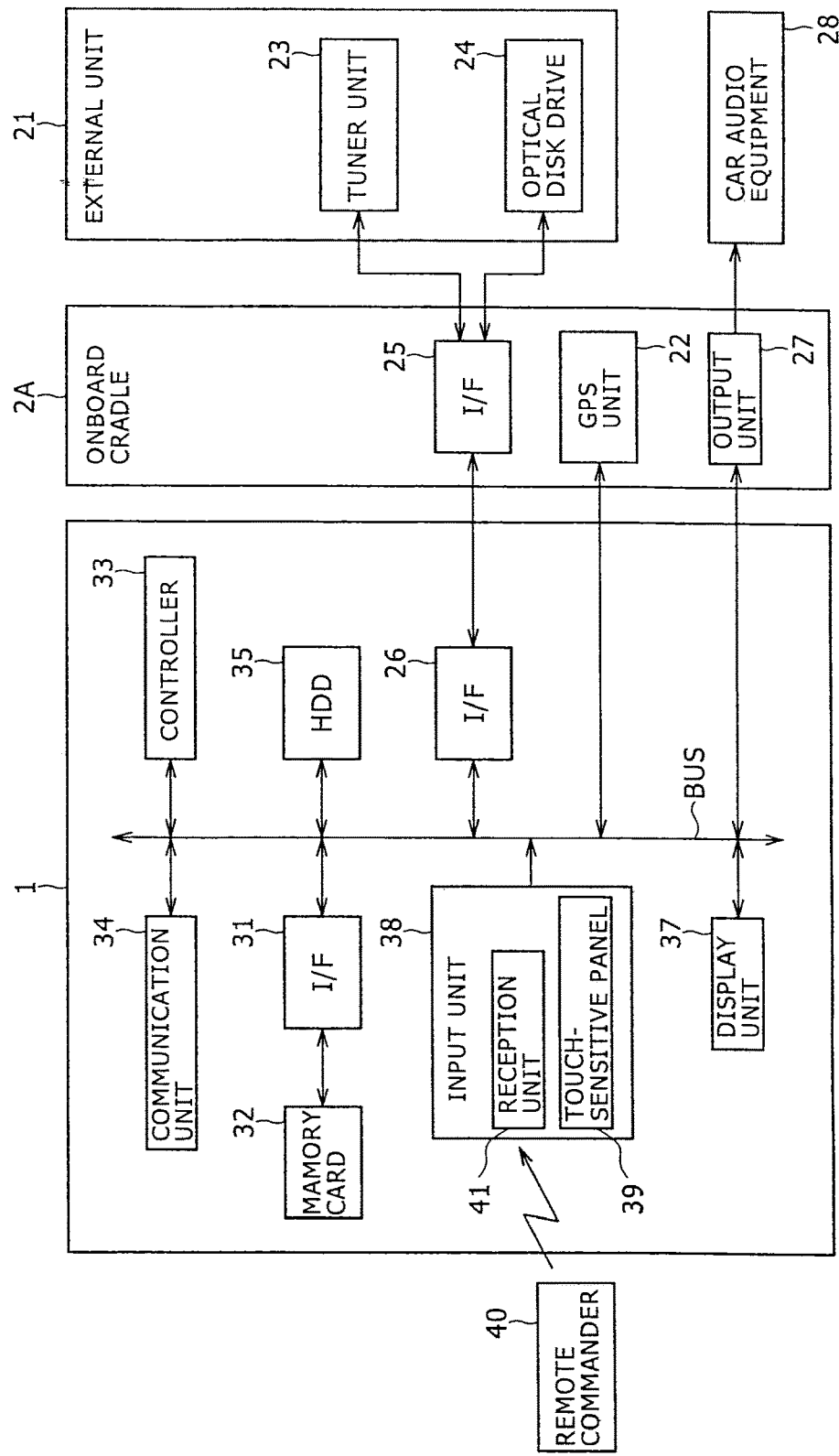
FIG. 2 is a block diagram of the vehicle-mounted apparatus shown in FIG. 1.

FIG. 2 is a block diagram outlining the vehicle-mounted apparatus 1 with its related structures. The apparatus 1 is connected to an external unit 21 via the onboard cradle 2A. The external unit 21 is located illustratively under the vehicle seat and includes a tuner unit 23 and an optical disk drive 24.

Under control of the vehicle-mounted apparatus 1, the tuner unit 23 receives TV broadcast waves and traffic information from VICS (Vehicle Information and Communication System) and outputs the received video data, audio data, and traffic information to the onboard cradle 2A. In turn, the vehicle-mounted apparatus 1 placed in the onboard cradle 2A presents the user with TV broadcasts and traffic information.

The optical disk drive 24 under control of the vehicle-mounted apparatus 1 plays optical disks such as DVD (digital versatile disk) or CD (compact disc) and outputs the reproduced video and audio data to the onboard cradle 2A. Set in the onboard cradle 2A, the vehicle-mounted apparatus 1 then presents the user with AV content coming through an auxiliary input port from the loaded optical disk.

The onboard cradle 2A includes a GPS unit 22 and an audio output unit 27. The GPS unit 22 is a device that detects and outputs the current location of the vehicle based on GPS (Global Positioning System) under control of the vehicle-mounted apparatus 1. Placed in the onboard cradle 2A, the apparatus 1 carries out navigation processes in keeping with current position information detected by the GPS unit 22.

The output unit 27 acquires audio and sound data from the vehicle-mounted apparatus 1, converts the acquired data into an analog signal, and outputs the signal on FM broadcast waves or through an external output terminal. When set in the onboard cradle 2A, the vehicle-mounted apparatus 1 receives the audio output in wired or wireless fashion from the output unit 27 and forwards the acquired audio and sound signal to car audio equipment 28 of the vehicle. In turn, the car audio equipment 28 outputs the audio and sound signal.

A similar output unit is also provided in the home cradle 2B so that such audio, sound and video signals may be output therefrom. When placed in the home cradle 2B, the vehicle-mounted apparatus 1 can present the user with various kinds of AV content on the TV receiver 4.

Setting the vehicle-mounted apparatus 1 into the onboard cradle 2A connects an interface 26 of the apparatus 1 to an interface 25 of the cradle. The interface 25, when connected with the interface 26, outputs and inputs diverse kinds of data to and from the external unit 21.

The interface 26 functions under control of a controller 33. With the vehicle-mounted apparatus 1 set in the onboard cradle 2A, the interface 26 outputs and inputs data to and from the external unit 21, and transmits and receives the input and output data onto and from a bus in the apparatus 1. When the vehicle-mounted apparatus 1 is placed in the home cradle 2B, the interface 26 outputs and inputs upload and download data to and from the computer 3.

An interface 31 of the vehicle-mounted apparatus 1 under control of the controller 33 outputs and inputs data to and from a memory card 32 inserted through a card slot located on one side of the apparatus 1, and transmits and receives the input and output data to and from the bus. In this setup, the vehicle-mounted apparatus 1 can acquire from the memory card 32 still images taken by an electronic still camera, and can record the acquired still images to the memory card 32.

A communication unit 34 is a transmission and reception device that operates on a wireless LAN (local area network). Under control of the controller 33, the communication unit 34 outputs data from the bus onto the network or acquires desired data from the network and outputs the acquired data onto the bus. Operating as it does, the communication unit 34 allows the vehicle-mounted apparatus 1 to connect to the Internet and to send and receive electronic mail.

A hard disk drive (HDD) 35 holds programs and content data for use by the vehicle-mounted apparatus 1 and outputs the data onto the bus under control of the controller 33. The hard disk drive 35 retains file data received from an external device through the interface 26 or 31, data acquired through the communication unit 34, data to be transmitted to external devices, and electronic mail data. The data thus retained can be output from the hard disk drive 35 onto the bus as needed. It is assumed that the programs held on the hard disk drive 35 have been installed there beforehand. Alternatively, the programs may be downloaded from a suitable recording medium through the interface 26 or 31 or from the network via the communication unit 34 before they are recorded to the hard disk drive 35. The recording medium may be any one of diverse media including optical disks, memory cards, or magnetic tapes.

A display unit 37 is illustratively a liquid crystal display device constituting the display screen 11 mentioned above in reference to FIG. 1. In operation, the display unit 37 displays diverse kinds of content, maps and other information under control of the controller 33.

An input unit 38 is constituted by a touch-sensitive panel 39, a reception unit 41, and an interface. The touch-sensitive panel 39 mounted on the display screen 11 detects fingertip operations performed on its surface. The reception unit 41 receives a remote control signal outputted from a remote commander 40. The interface detects operations carried out on the controls 13P through 18P for control over sources, programs and others resources. The user's operations detected by these units are reported to the controller 33. With such components in place, the vehicle-mounted apparatus 1 executes operation switchovers in response to the operations performed on the controls 13P through 18P on the side of the display screen 11, on the touch-sensitive panel 39 on the display screen 11, or on the remote commander 40.

The remote commander 40 is furnished with controls equivalent to those on the vehicle-mounted apparatus 1 such as the controls 13P through 18P, as well as to menu-based scrolls on the display screen 11. When any of its controls is manipulated, the remote commander 40 outputs a corresponding infrared remote control signal.

(1-2) Controller

The controller 33 is an arithmetic processing device. In response to the operations on the remote commander 35 or on other controls following their detection through the input unit 38, the controller 33 executes relevant programs held on the hard disk drive 35. This permits execution of navigation-related processing reflecting the user's operations and presents the user with various kinds of content.

More specifically, when the user gives instructions to receive TV broadcasts, the controller 33 forwards the instructions through the interfaces 26 and 25 to the tuner unit 23 and causes the tuner to switch received channels as instructed by the user. The video and audio data thus received by the tuner unit 23 is input through the interface 26. The video data is displayed on the display unit 37 while the audio data is output to the car audio equipment 28 via the output unit 27. In this manner, TV broadcast content is provided to the user.

If the user gives instructions to reproduce video content from the hard disk drive 35, the controller 33 causes the hard disk drive 35 to reproduce relevant video content files. In the same manner as when TV broadcasts are received, the video and audio data output from the hard disk drive 35 is provided to the user. If the user gives instructions to reproduce audio content from the hard disk drive 35, the controller 33 likewise causes the hard disk drive 35 to output relevant audio data through the output unit 27. If the user instructs items of content to be switched during the reproduction, the corresponding files are switched upon retrieval from the hard disk drive 35, and the relevant processes are repeated.

If the user gives instructions to display a map, the controller 33 acquires current position information from the GPS unit 22, loads relevant map data from the hard disk drive 35 based on the acquired information, and causes the display unit 37 to display the map using the loaded map data. If the user gives instructions to watch or listen to content through the auxiliary input, the controller 33 controls the optical disk drive 24 through the interface 26 so as to acquire video and audio content data from the drive 24. The video and audio content data thus obtained is processed by the applicable components before being provided to the user. The acquired content may be recorded to the hard disk drive 35 if so instructed by the user.

If instructions are given to browse websites on the Internet, the controller 33 starts up browser software causing the communication unit 34 to connect to the Internet. Following data acquisition via the communication unit 34, video data is displayed on the display unit 37 and audio data is output through the output unit 27. If instructions are given to handle electronic mail, the controller 33 starts up a mailer to get electronic mail displayed on the display unit 37 upon retrieval from the hard disk drive 35 or to acquire such mail through the communication unit 34. Electronic mail entered by the user is accepted and transmitted to its destination through the communication unit 34.

Given instructions to view still images, the controller 33 accesses either the memory card 32 or the hard disk drive 35 through the interface 31 so as to acquire the relevant still image files, and causes the acquired photo files to be displayed on the display unit 37. Depending on the user's instructions, the still image files may be exchanged between the memory card 32 and the hard disk drive 35 or may be deleted from these components.

If the user gives instructions to start navigation processing, the controller 33 receives destination and other related information from the user, obtains current position information from the GPS unit 22, and initiates route searches based on the acquired information. The controller 33, having detected an appropriate route to the destination, causes diverse kinds of information to be output as specified by the user for guidance.

Figure 3:
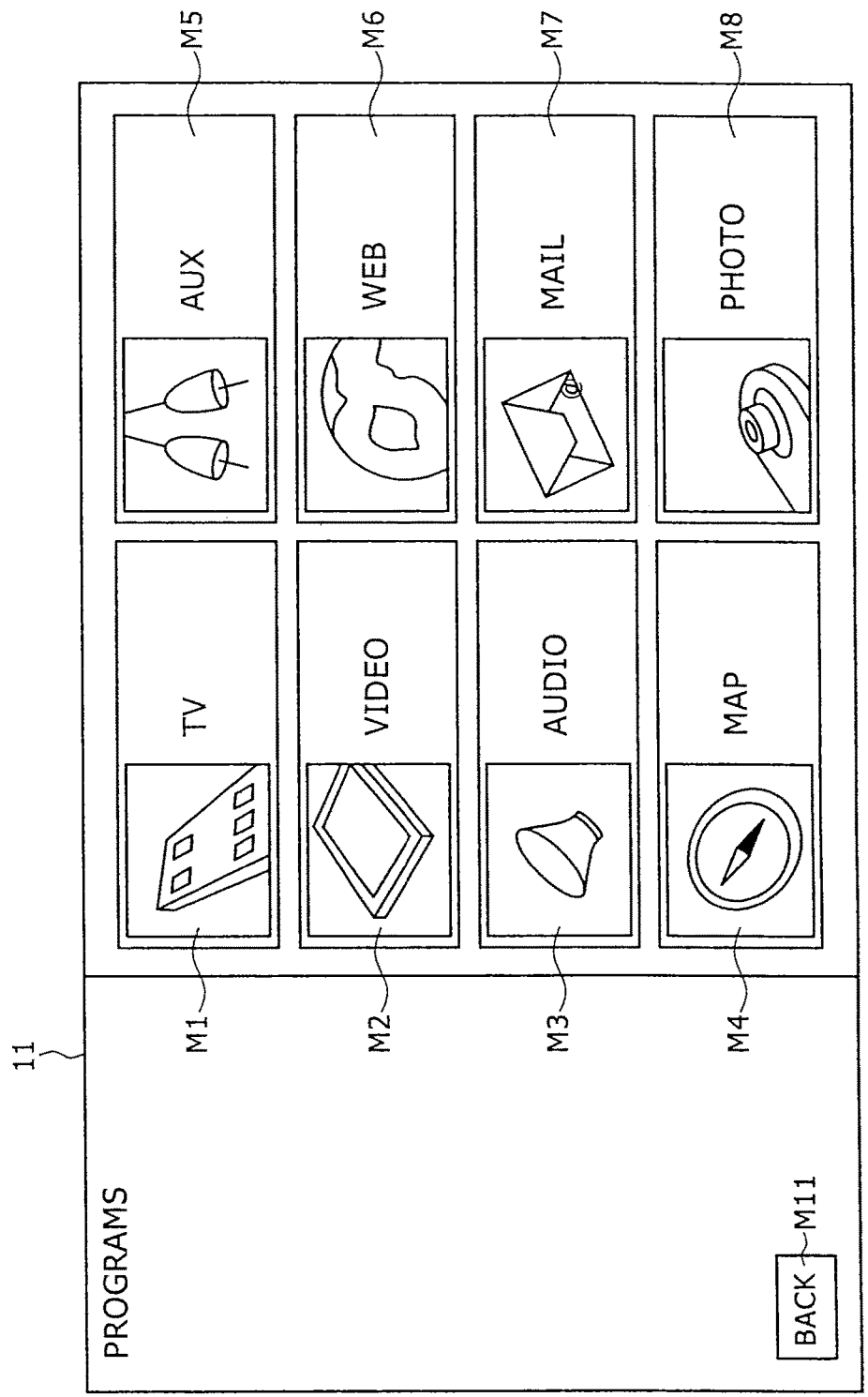
FIG. 3 is a plan view of a program menu screen displayed on a touch-sensitive panel of the vehicle-mounted apparatus in FIG. 1.

In the above processing, the controller 33 displays relevant menus in response to the user's operations on the remote commander 40 or on the touch-sensitive panel 39 in order to accept instructions from the user. FIG. 3 is a plan view of a program menu screen displayed on the touch-sensitive panel 39 of the display screen 11 under control of the controller 33. The program menu screen of FIG. 3 provides a menu suitable for operations on the touch-sensitive panel 39. In addition to the touch-sensitive menu screen, the embodiment provides a program menu screen for use with the remote commander 40. This program menu screen provides functional providing which are equivalent to those of the touch-sensitive menu screen but which are adapted specifically to the operations of the remote commander 40. If the user's operation giving instructions to display the program menu screen is interpreted as involving the use of the touch-sensitive panel 39, the controller 33 causes the touch-sensitive program menu screen to be displayed; if the user's operation giving instructions to display the program menu screen is found involving the use of the remote commander 40, then the controller 33 causes the program menu screen for use with the remote commander 40 to be displayed.

The program menu screen permits selection of content items to be provided to the user. As such, the menu screen shows applications that may be selected for use with the vehicle-mounted apparatus 1. In this example, the program menu screen includes: a menu option M1 for receiving TV broadcasts, a menu option M2 for reproducing video content from the hard disk drive 35, a menu option M3 for reproducing audio content from the hard disk drive 35, a menu option M4 for displaying maps, a menu option M5 for reproducing content through the auxiliary input, a menu option M6 for starting up the browser for browsing websites on the Internet, a menu option M7 for processing electronic mail, and a menu option M8 for instructing a process of still images. The program menu screen also includes a menu option M11 that may be selected to go back to the immediately preceding state of the menu screen.

On the program menu screen for use with the touch-sensitive panel 39, the menu options M1 through M8 for selecting applications are all in boxes of the same size, with the exception of the menu M11. The menu options M1 through M8 carry no cursors representative of a focus, and are neatly arranged on display so that the user watching the screen may feel ready to select any of them by operating the touch-sensitive panel 39. When any one of the menu options M1 through M8 on the program menu screen is selected by the user operating the touch-sensitive panel 39, the controller 33 causes all components involved to carry out the relevant process. If the user operates the menu option M11 on the program menu screen, the controller 33 switches to the immediately preceding display.

The program menu screen for use with the remote commander 40, on the other hand, has the same menu option layout as that shown in FIG. 3 but is adapted to the operations of the remote commander 40. When the user operates on this program menu screen, the controller 33 switches focuses in response to the user's operations. The controller 33 also carries out the application related to the currently focused menu option while providing overall performance control.

It might happen that the program menu screen is taken over by the source control 13P on the control panel or by a corresponding key on the remote commander 40. In such a case, the controller 33 also starts up selectively the application program relative to the menu option M1, M2 or M3.

At this point, the controller 33 references the most recent settings in what may be called a last-state memory in selectively activating the application program associated with the menu option M1, M2 or M3. For example, if a TV program was being watched when power was last turned off, then operating the source control 13P or its equivalent remote commander key causes the TV broadcast in question to start getting received again. If one of such controls is again operated while the application program relative to one of the menu options M1, M2 and M3 is being executed, the ongoing program is halted and another application program associated with another menu option is started. That is, successively operating the control causes each of the application programs to be activated individually and cyclically among the menu options M1, M2 and M3.

Similarly, it might happen that the program menu screen is taken over by the map control 17P on the control panel or by a corresponding key on the remote commander 40. In that case, the controller 33 also starts up selectively the application program relative to the menu option M4.

When any one of the application programs relative to the menu options M1, M2 and M3 is being executed, an instruction to start another of the three application programs prompts the controller 33 to stop the ongoing program. By contrast, where one of the application programs associated with the menu options M4 through M8 is being executed, an instruction to start another of the five application programs causes the controller 33 to let the ongoing program remain active. That is, this embodiment illustratively allows navigation processing to proceed unchecked while letting the user enjoy TV broadcasts.

Figure 4:
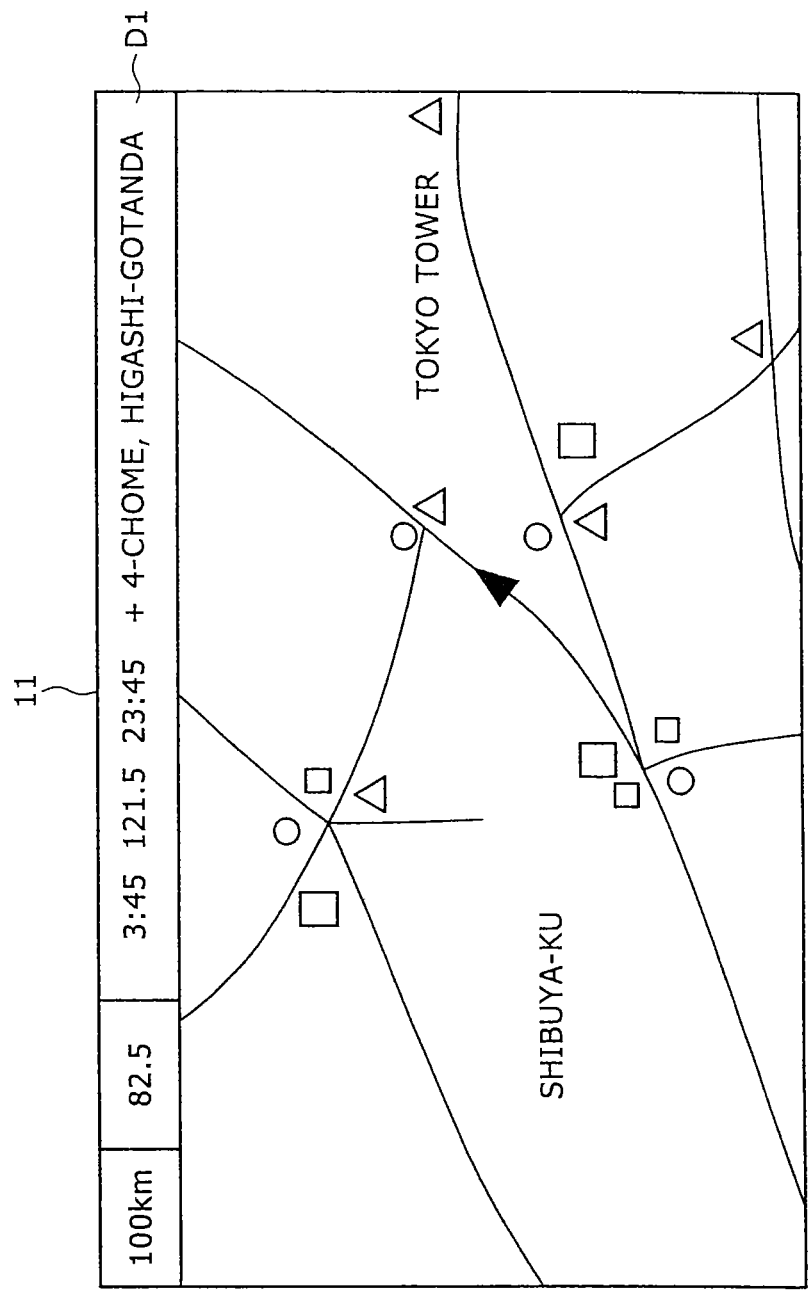
FIG. 4 is a plan view of a map display on the vehicle-mounted apparatus of FIG. 1.
Figure 6:
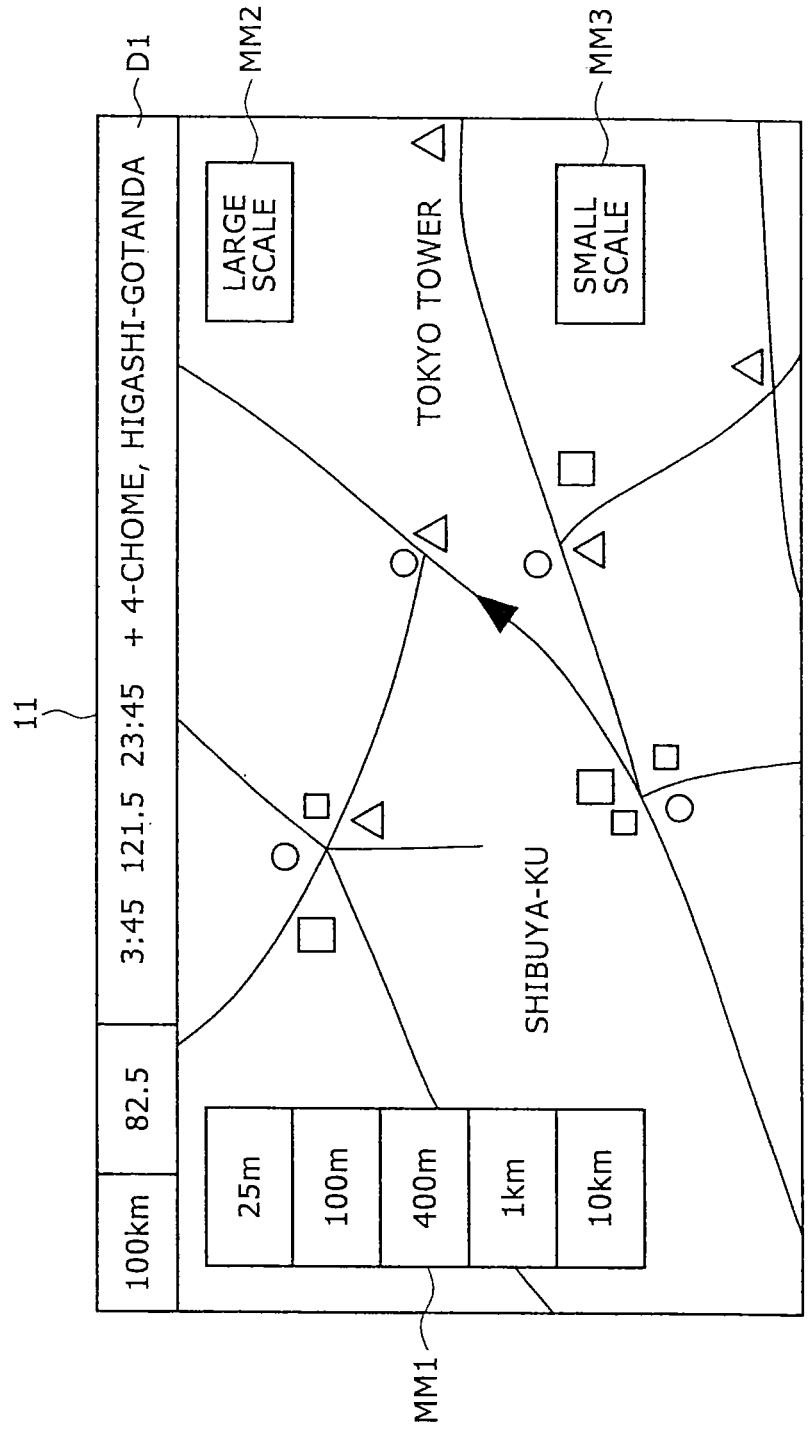
FIG. 6 is a plan view explaining an information display on the main screen of FIG. 4.

FIG. 4 is a plan view of a map display screen. If the menu option M4 for map display is selected on the program menu screen, or if the map control 17P on the control panel or a corresponding key on the remote commander 40 is operated, the controller 33 displays a map showing the surroundings of the current position. At the top of the screen, a belt-shaped area indicates information D1 relative to the map display. If the user has given instructions in advance to proceed with navigation processing, the belt-shaped area also displays navigation-related information.

Such advance settings are made on a hierarchically structured menu screen in FIG. 5, displayed by operating the menu control 15P on the control panel or a corresponding key on the remote commander 40. On this display screen, the top layer menu options for destination entry are displayed on the left. Selecting one of the top layer menu options causes a corresponding lower layer menu to be displayed at the center. When one of the center menu options is selected, a corresponding still-lower layer menu is displayed on the right. FIG. 4 shows a typical state attained when a "location" option is selected in the top layer menu, followed by the selection of a "genre" option in the corresponding lower layer menu. When these menu options are selected in the hierarchically structured menu, the controller 33 accepts entry of a given destination, searches for a suitable route from the current position to the specified destination, and provides the user with relevant guidance until the destination is reached.

When the menu screen is displayed by operating the menu control 15P and when suitable menu options are selected in the top to lower menu layers, the vehicle-mounted apparatus 1 allows the user to specify whether or not to display the belt-shaped area and to designate a two-screen display, the split ratio for the two-screen display, 2-D or 3-D map display, and other map-related display settings. The display example in FIG. 4 applies to a case where navigation processing is being executed based on the menu screen settings.

The controller 33 indicates the scale of the currently displayed map in the leftmost position of the belt-shaped area at the top of the map display screen. Also indicated in that area, side by side with the current time of day, is the currently established reception frequency at which to receive traffic information from VICS. Shown further to the right is navigation-related information including the distance to the destination and an estimated time of arrival. Also indicated is current position information made up of a crossing mark and an address of the current location. Where navigation processing is not specified, the belt-shaped area does not indicate any navigation-related information. In the manner described, the controller 33 displays information D1 related to map display.

If the scale indication (shown as "100 km") is touched on the touch-sensitive panel 39, the controller 33 displays a switchable scale menu option MM1, a large-scale menu option MM2, and a small-scale menu option MM3. If the scale menu option MM1 is selected by operation of the touch-sensitive panel 39, scales for map display are switched. If the large-scale or small-scale menu option MM2 or MM3 is selected, the scale in effect is changed in increments of the setting to the scale menu MM1. That is, the controller 33, having displayed relevant menu options reflecting the operation on the touch-sensitive panel 39, varies the scale for map display as instructed. By contrast, if the remote commander 40 is operated for zoom-in or zoom-out, the controller 33 switches the scale in increments in the same manner as when the small-scale or large-scale menu option MM2 or MM3 is selected.

Suppose that with the map displayed, the user is detected drawing on the touch-sensitive panel 39 a clockwise circular arc as indicated by reference character A in FIG. 7B2. In this case, the controller 33 enlarges the scale of map display for switchover from FIG. 7A to FIG. 7C, as when the scale menu option MM1 is selected followed by selection of the large-scale menu option MM3 for enlarged map display. If the user is detected drawing a circular arc counterclockwise on the screen as indicated by reference character B in FIG. 7B1, then the controller 33 reduces the scale of map display for switchover from FIG. 7C to FIG. 7A, as when the scale menu option MM1 is selected followed by selection of the small-scale menu option MM2 for reduced-scale map display. Apart from menu-based operations, the controller 33 thus allows the user to change the scale of map display by operating the touch-sensitive panel 39 in an intuitive manner, which enhances the user's ease of operation. When the map scale is varied through detection of the fingertip locus, the controller 33 displays the scale menu options MM2 and MM3 on different scales for a predetermined time period, not shown in any of FIGS. 7, 7B1, 7B2 and 7C. This arrangement is intended to retain display consistency with the menu-based scale change so that the user will not be confused.

Figure 8A:
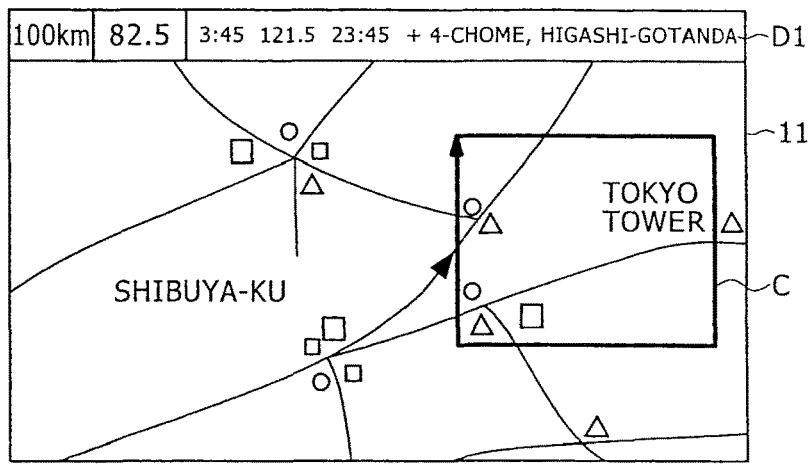
FIGS. 8A, 8B, and 8C are plan views explaining how displays are switched when a child screen is selected on a parent screen.

When the user is detected drawing a rectangular locus on the touch-sensitive panel 39 as indicated by reference character C in FIG. 8A, the controller 33 displays on the current map a child screen centering on the approximate center of the rectangular locus. If a 2-D map is currently displayed by the controller 33 executing only the map-related application program, then a 3-D map is shown in the child screen. Conversely, if a 3-D map is currently displayed by the controller 33 executing only the map-related application program, then a 2-D map is shown in the child screen. If the controller 33 is concurrently executing a video content-related application program illustratively for TV broadcast reception, a display associated with the ongoing program is shown in the child screen. Two-dimensional (2-D) display unit an ordinary plan-view display of land given when the land is viewed directly from above, while three-dimensional (3-D) display signifies a bird's-eye view display of land in effect when the land is viewed from a viewpoint high enough to recognize the undulations of roads and different heights of buildings.

If the child screen is to be displayed by operation of menu options, it involves displaying the hierarchically structured menu screen such as that of FIG. 5 to let the user select the top to lower-level menu options. As indicated above, such hierarchically structured menu operations may be replaced by the user's drawing of suitable loci on the touch-sensitive panel 39 to input an approximate external shape of the child screen desired to be used.

If the user is detected drawing a rectangular locus, the operation is interpreted as the input of a rectangle-shaped child screen. That is the user's gesture entered through the touch-sensitive panel 39 to request display of a specific child screen. Given such a fingertip gesture onto the touch-sensitive panel 39, this embodiment provides the same display switchover as when the menu screen is displayed and suitable menu options are selected, whereby the user's ease of operation is improved. Gestures are made by the user employing his or her fingertips or some other suitable object to draw loci on the touch-sensitive panel 39. In the above example, the user's gesture has resulted in the switching of displays on the screen.

Figure 8B:
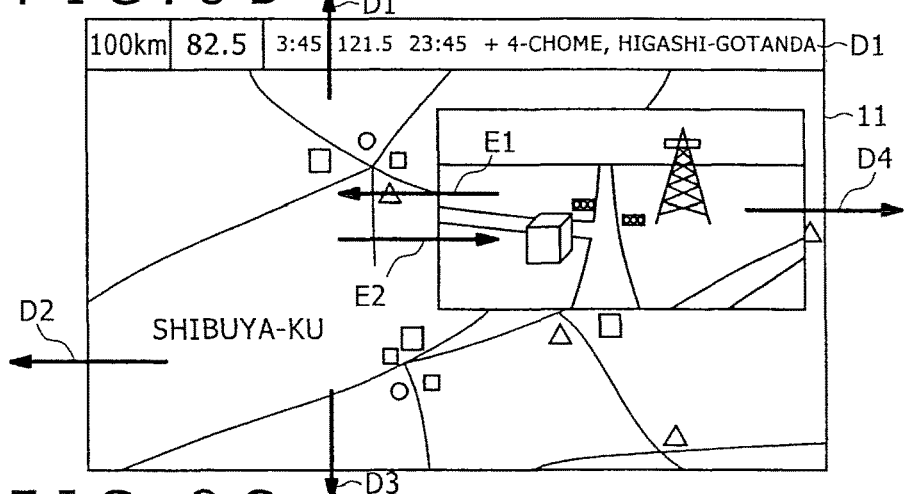

With a child screen displayed, the user may be detected drawing on the touch-sensitive panel 39 a locus going out of the display area of the display screen 11 showing the parent or child screen, as indicated by reference characters D1, D2, D3 and D4 in FIG. 8B. In such cases, display of the applicable parent or child screen is discontinued. When the parent screen display is stopped, the child screen is displayed all over the screen. If the application program for displaying the parent screen is not the same as the application program for display of the child screen, then the application program whose window is discontinued is allowed to run in the background.

Where display of the parent or child screen is to be discontinued by operating relevant menu options in the foregoing case, this embodiment would also involve the user carrying out the hierarchically structured menu operations as discussed above with reference to FIG. 5. Alternatively, the discontinuation of the display is accomplished by the user drawing on the display screen 11 a locus going out of the display area for the parent or child screen. This is a fingertip gesture that may be regarded as one for removing the touched parent or child screen from the display screen. The embodiment thus allows the user to execute intuitively the display switchover as envisaged by the user, with a simple fingertip gesture entered through the touch-sensitive panel 39 whereby the user's ease of operation is enhanced. This gesture by the user designates a display transition on the display screen.

Figure 8C:
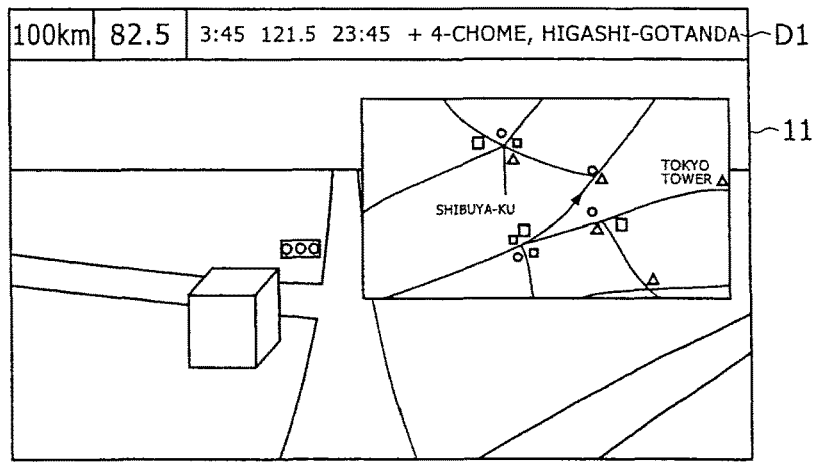

Suppose now that with a child screen displayed, the user is detected drawing on the touch-sensitive panel 39 a locus going from the child screen into the parent screen as indicated by reference character E1 in FIG. 8B, or from the parent screen into the child screen as indicated by reference character E2. In this case, the controller 33 switches what is being displayed between the parent screen and the child screen, as shown in FIG. 8C in contrast to FIG. 8B.

Where display of the parent or child screen is to be discontinued by operating relevant menu options in the foregoing case, this embodiment would also involve the user carrying out the hierarchically structured menu operations as discussed above with reference to FIG. 5. The locus drawn by the user from the child screen into the parent screen represents the user's intention to bring by fingertips what is being displayed from the child screen into the parent screen; the locus drawn conversely from the parent screen into the child screen denotes the user's intention to move by fingertips what is being displayed from the parent screen into the child screen. These are fingertip gestures that may be regarded as ones for switching what is being displayed between the parent screen and the child screen. The embodiment thus allows the user to execute intuitively the display switchover as envisaged by the user, with simple fingertip gestures entered through the touch-sensitive panel 39 whereby the user's ease of operation is improved. These gestures by the user result in the desired display transitions on the display screen.

Suppose that with a 2-D parent screen alone displayed, the user is detected drawing on the touch-sensitive panel 39 a locus representing a numeral "3" as shown in FIG. 9B2. In that case, the current 2-D display is replaced by a 3-D display as shown in FIG. 9C in contrast to FIG. 9A. It might also happen that with a 3-D parent screen alone displayed, the user is detected drawing on the touch-sensitive screen 39 a locus denoting a numeral "2" as indicated in FIG. 9B1. In this case, the current 3-D display is replaced by a 2-D display as shown in FIG. 9A in contrast to FIG. 9C.

Where the above display switchover is to be performed by operating suitable menu options, this embodiment would also involve the user carrying out the hierarchically structured menu operations as discussed above with reference to FIG. 5. Alternatively, the display switchover is accomplished by the user drawing on the touch-sensitive panel 39 the appropriate numerals requesting 2-D or 3-D display. These are fingertip gestures that may be regarded as ones replacing the corresponding menu options. The embodiment thus allows the user to execute intuitively the display switchover as envisaged by the user, with simple fingertip gestures entered through the touch-sensitive panel 39 whereby the user's ease of operation is enhanced. These gestures by the user result in the desired display switchovers on the display screen.

Figure 10A:
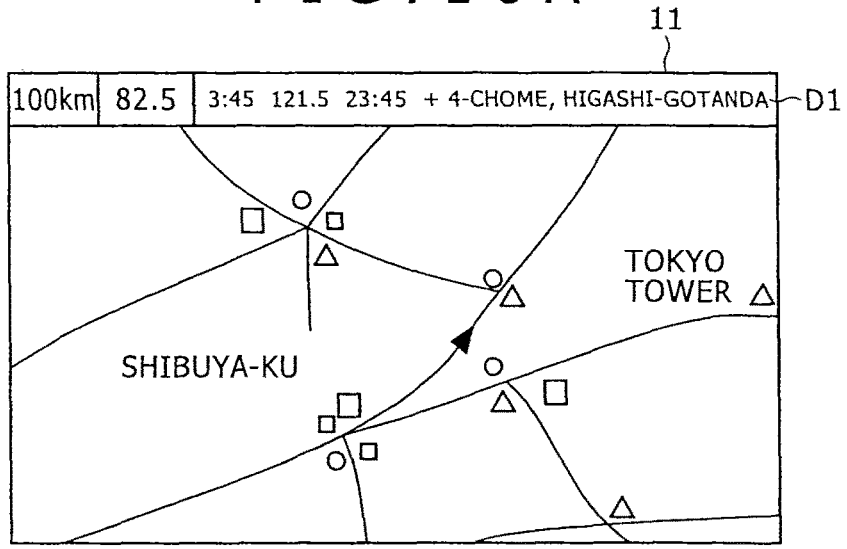
FIGS. 10A, 10B, and 10C are plan views explaining how displays are switched when a viewpoint is shifted.
Figure 10B:
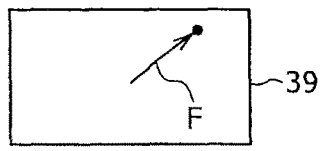
Figure 10C:
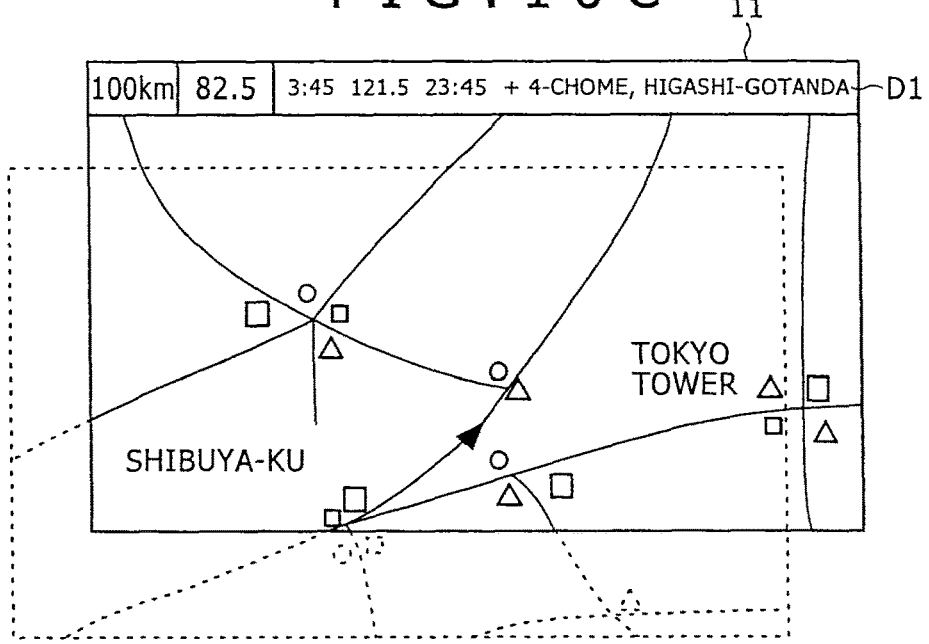

Suppose that with the parent screen alone displayed, the user is detected drawing on the touch-sensitive panel 39 a locus of a substantially straight line from the approximate center of the screen toward its outer frame, the user being detected keeping a press onto the panel surface at the end of the locus, as indicated by reference character F in FIG. 10B. In that case, the displayed map is scrolled in the direction of the locus as shown in FIG. 10C in contrast to FIG. 10A. The controller 33 keeps the display scrolled as long as the user maintains the press on the touch-sensitive panel 39.

In the case above, the locus entered by the user through the touch-sensitive panel 39 is interpreted as a gesture for requesting movement of the viewpoint. The embodiment thus allows the user to execute intuitively the display switchover as envisaged by the user, with a simple fingertip gesture entered through the touch-sensitive panel 39 whereby the user's ease of operation is boosted.

Figure 11A:
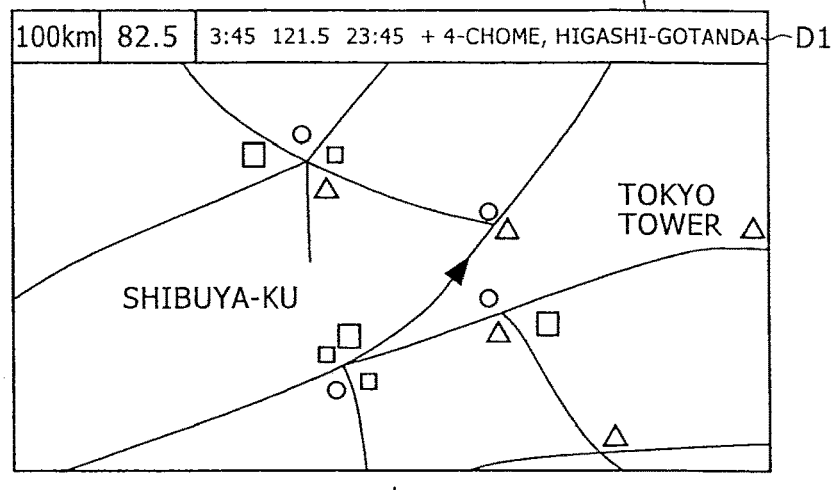
FIGS. 11A, 11B, and 11C are plan views explaining how displays are switched when a screen is split.
Figure 11B:
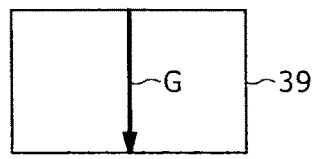
Figure 11C:
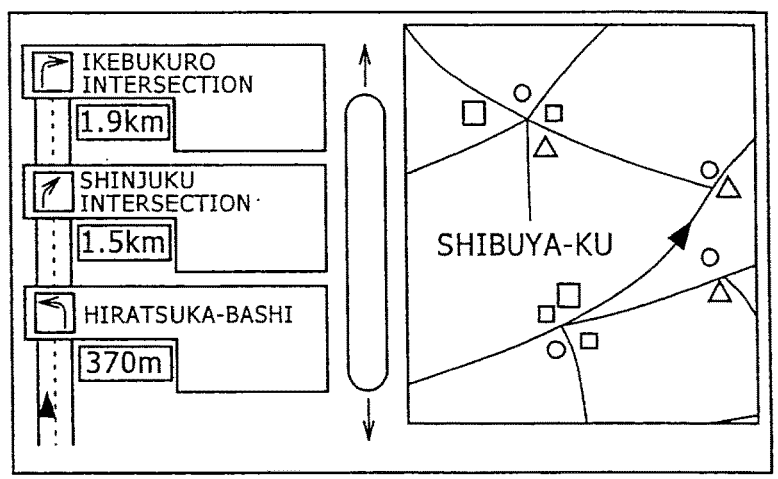

With the parent screen alone displayed, the user may be detected drawing on the touch-sensitive panel 39 a locus of a straight line approximately splitting the screen into the right-hand and left-hand half, as indicated by reference character G in FIG. 11B. In that case, the screen is divided in two, with the right-hand half displaying a map as shown in FIG. 11C in contrast to FIG. 11A. The left-hand half of the screen gives traffic information which, in the example of FIG. 11C, successively indicates landmarks along the route.

Where the above display switchover is to be performed by operating suitable menu options, this embodiment would also involve the user carrying out the hierarchically structured menu operations as discussed above with reference to FIG. 5. Alternatively, the split-window display is accomplished by the user drawing on the touch-sensitive panel 39 the suitable fingertip locus which requests division of the window and which replaces the corresponding menu options. The embodiment thus allows the user to execute intuitively the display switchover as envisaged by the user, with a simple fingertip gesture entered through the touch-sensitive panel 39 whereby the user's ease of operation is improved.

It might happen that with both the parent and the child screens displayed, the controller 33 detects in either window the clockwise or counterclockwise circular locus as discussed above with reference to FIGS. 8A, 8B and 8C, or the scroll-prompting locus as described with reference to FIGS. 10A, 10B and 10C. In such cases, the controller 33 changes the scale of the map or scrolls the display in the applicable window. This is another feature adding to the user's ease of operation.

Figure 12A:
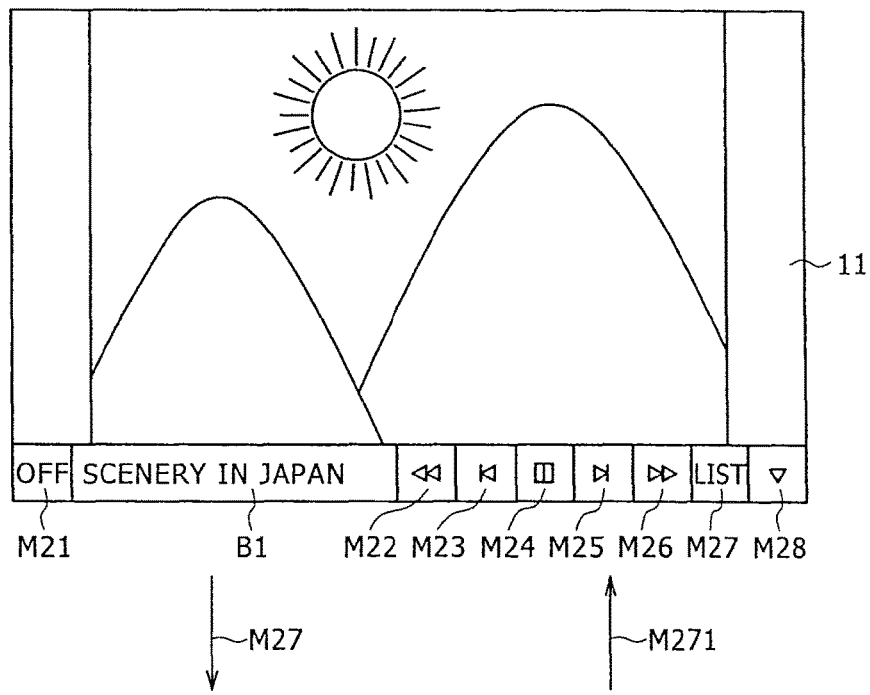
FIGS. 12A and 12B are plan views explaining video content providing.

FIG. 12A is a plan view of a main screen associated with the menu option M2 about the video displayed by such instructions. The controller 33 displays a content image over the entire screen except for a belt-shaped area at the bottom of the screen. At this point, the controller 33 reproduces content from where it was last turned off for the user's benefit, by referencing the reproduction settings in the so-called last-state memory with regard to the most-recently reproduced file in connection with the menu option M2. The vehicle-mounted apparatus 1 thus allows the user to enjoy the desired content simply from where it was last turned off.

At the bottom of the screen is the belt-shaped display area indicating a number of menu options related to the current application along with information about the image being displayed. The belt-shaped display area is called the control bar hereunder. More specifically, the control bar B1 shows in its leftmost position an "OFF" menu option M21 that doubles as an end key and a back key. When the "OFF" menu option M21 is operated on the touch-sensitive panel 39, the controller 33 terminates this application and switches to the touch-sensitive program menu screen. To the right of the menu option M21 on the control bar B1 is a content title, i.e., attribute information about the currently displayed content. Other menu options are shown right-justified on the control bar B1.

These menu options include a "rewind" menu option M22, a "back to the preceding chapter" menu option M23, a "play/stop switchover" menu option M24, a "go to the next chapter" menu option M25, a "fast-forward" menu option M26, a "list display" menu option M27, and a "control bar on/off" menu option M28, arranged in that order from left to right on the control bar B1. The controller 33 accepts any of the menu options M21 through M28 selected by the user operating the touch-sensitive panel 39 or the remote commander 40 for focus switching. When any menu option is selected, the controller 33 controls the relevant components in a way that accomplishes what is specified by the user.

Suppose that the user has selected the menu option M27 for list display from among the menu options M21 through M28 under control of the controller 33. In such a case, the controller 33 switches the entire display to a list menu screen shown in FIG. 12B. This list menu screen lists content items selectable by the user. At the top of the screen is a title that identifies the current application. To the right of the title is a menu option M275 for making various settings regarding this application. On the left-hand side of the screen are a "back" menu option M271, a "cabinets" menu option M272, a "playlists" menu option M273, and a "video capsules" menu option M274. The "cabinets" menu option M272 for listing so-called folders, when selected, gives a list of selectable folders to the right. The "playlists" menu option M273, when selected, gives a list of selectable content items in the folder currently selected from inside the selectable folder list. The selectable content item list is displayed on the right when the menu option M273 is selected. The "video capsules" menu option M274 is used to designate display of a thumbnail image of any one of the content items being listed on display.

Figure 12B:
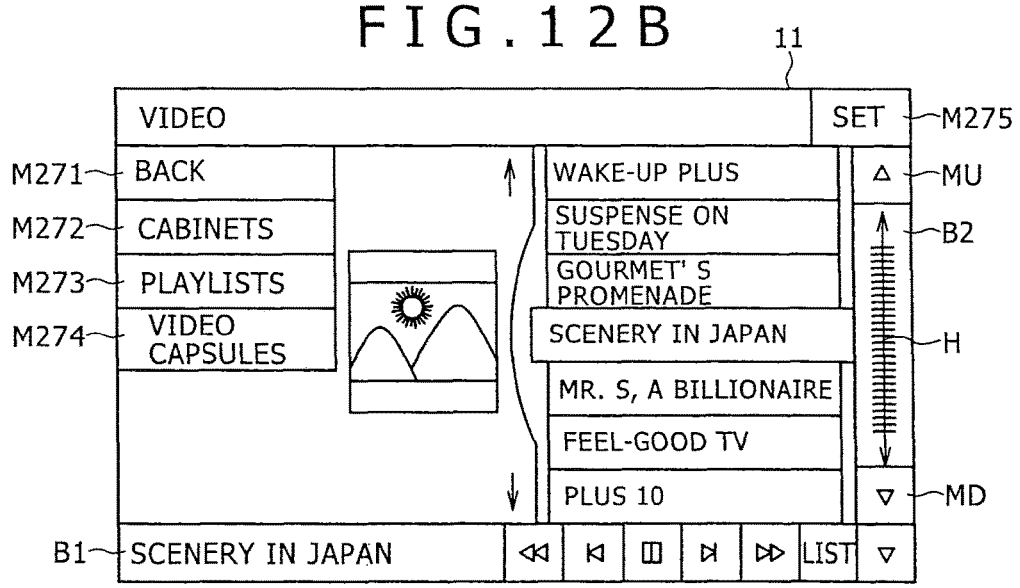

In the middle of the list menu screen is an area allocated to display a thumbnail image. If the "video capsules" menu option M274 is not selected, this area displays the currently reproduced content. To the right of the thumbnail display area on the list screen appear lower-layer menu options corresponding to the upper-layer menu options M271 through M274 located on the left. More specifically, a list of content items and folders is shown corresponding to the user-selected menu option from among the options M271 through M274. Immediately after the list screen is turned on, a list appears which includes the menu of the content item being reproduced at present. The list display is constituted by content titles and by the names of the folders involved. The example of FIG. 12B shows a list of content items associated with the "playlists" menu option M273.

If not all selectable content items and folders can be included in the list display area, hidden content items or folders may be scrolled into view. The directions in which scrolls are available are indicated by arrows on the left-hand side of the list. In the example of FIG. 12B, an upward-directed arrow and a downward-directed arrow are shown, indicating that the content list may be scrolled up or down for more available items that are currently hidden from view.

In the case above, the controller 33 displays a scroll bar B2 to the right of the list display, as well as menu options MU and MD at the top and the bottom of the scroll bar B2 indicating the availability of upward and downward scrolls respectively. At the bottom of this list display, the control bar B1 appears. In the list thus displayed, the currently focused menu option is shown slightly projected to the left.

When any one of the menu options M271 through M275 or of the menu options on the control bar B1 is selected by the user through the touch-sensitive panel 39, the controller 33 causes the relevant components to change the list display accordingly. More specifically, when the user selects one of the items on the list display via the touch-sensitive panel 39, the controller 33 sets the user-selected content item for reproduction and returns to the initial display screen (FIG. 12A). At this point, if the "video capsules" menu option M274 is being selected by the user, a still image of the user-selected content item is displayed in the thumbnail display area. If the user proceeds to operate on the thumbnail display area or to select the same content item again on the touch-sensitive panel 39, the controller 33 sets the user-selected content item for reproduction and returns to the initial display screen. If the user performs similar operations on the touch-sensitive panel 39, the controller 33 displays a list of content items retrieved from the user-selected folder provided the "playlists" menu option M273 is selected.

If operation of the menu option MU or MD on the scroll bar B2 is detected on the content selection screen, the list display is scrolled accordingly. Specifically, operating the menu option MU for upward scroll causes the list display to scroll up; operating the menu option MD for downward scroll causes the list display to scroll down. If a drag operation on the scroll bar B2 is detected on the touch-sensitive panel 39 as indicated by an arrow H, the list display is scrolled in the direction of the drag. As described, even when upper-layer and lower-layer menu options are displayed concurrently so that not all menu options can be accommodated in a single window, desired menu options can still be reached and selected unfailingly. With the available screen size limited on the vehicle-mounted apparatus 1, a growing number of content items may not be contained within a single display at a time. In such a case, the ability to scroll the display as desired contributes to improving the user's ease of operation.

On the list display above, the controller 33 gives a display of the menu option shown slightly projected to the left (i.e., focused option). When instructions are given to scroll the list display, the controller 33 causes the focused menu to scroll in keeping with the list display being scrolled. Thus when the number of content items available for display is limited, the controller 33 may stop list display scroll and concentrate instead on focus scroll.

On the vehicle-mounted apparatus 1, as described above, the touch-sensitive panel 39 or the remote commander 40 is operated by the user keeping track of the hierarchically structured menu options so as to reach the desired content item. The content item thus selected is retrieved from the video content items stored on the hard disk drive 35 and reproduced for the user's enjoyment.

Figure 13:
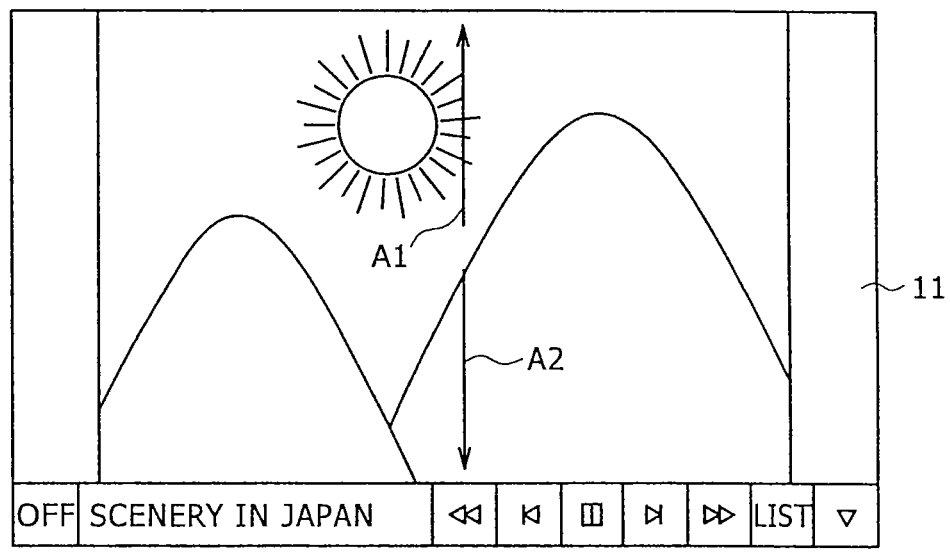
FIG. 13 is a plan view explaining a video content display switchover.
Figure 14:
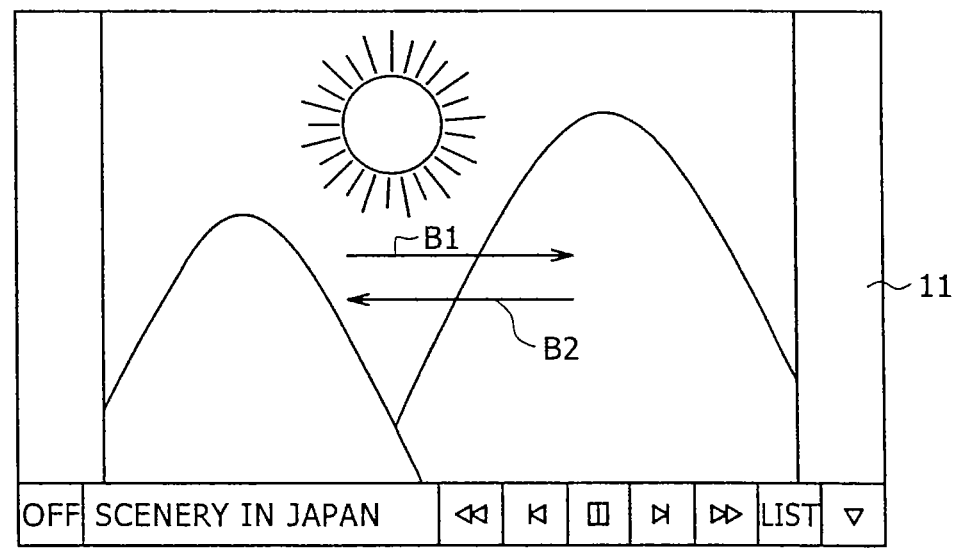
FIG. 14 is a plan view explaining another video content display switchover.

Suppose now that on the video content display screen discussed above in reference to FIGS. 12A and 12B, the user is detected drawing on the touch-sensitive panel 39 an upward-directed straight-line locus indicated by reference character A1 in FIG. 13. In that case, the controller 33 switches from the current content item to the next item on the content list display for reproduction. Conversely, if the user is detected drawing a downward-directed straight-line locus as indicated by reference character A2, then the controller 33 switches the current content item to the immediately preceding item on the content display list for reproduction. Alternatively, the user may draw a left-to-right straight-line locus crossing the middle of the screen as indicated by reference character B1, which may be interpreted as the instruction to switch to the next content item for reproduction. The user may also draw a right-to-left straight-line locus crossing the middle of the screen as indicated by reference character B2, which may be interpreted as the instruction to switch to the immediately preceding content item for reproduction.

Where the content display switchover above is to be performed by operating suitable menu options, this embodiment would also involve the user carrying out the hierarchically structured menu operations as discussed above with reference to FIG. 5. Alternatively, the display switchover is accomplished by the user drawing on the touch-sensitive panel 39 the suitable fingertip loci for moving the menu forward or backward. In this case, too, the embodiment allows the user to execute intuitively the desired display switchover, with simple fingertip gestures entered through the touch-sensitive panel 39 whereby the user's ease of operation is enhanced.

Figure 15:
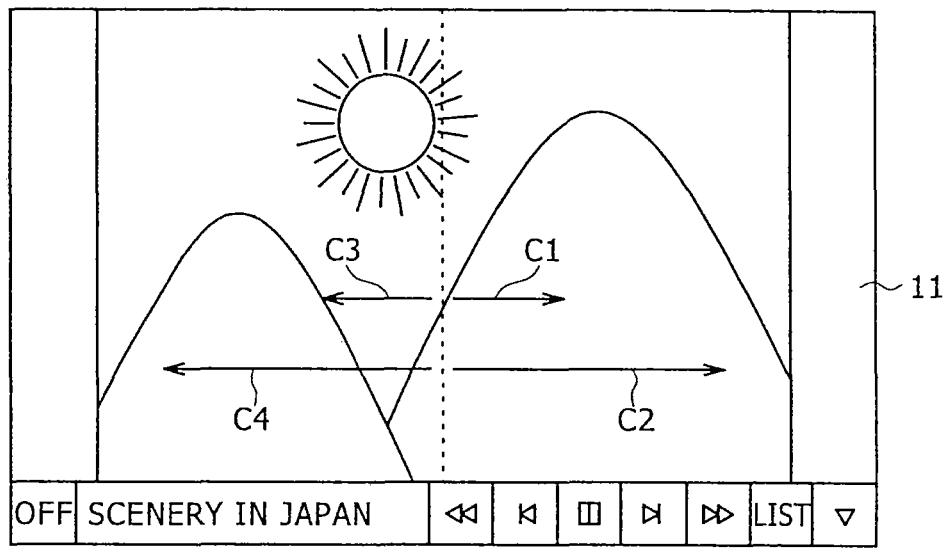
FIG. 15 is a plan view explaining how displays are switched when the rate of video content reproduction is changed.

Suppose that on the video content display screen, the user is detected drawing on the touch-sensitive panel 39 a rightward-directed short straight-line locus on the right-hand half of the screen, as indicated by reference character C1 in FIG. 15. In this case, the controller 33 switches content reproduction to slow-motion reproduction. If the user is detected drawing a rightward-directed long straight-line locus on the right-hand half of the screen, as indicated by reference character C2 in FIG. 15, the controller 33 switches content reproduction to fast-forward reproduction. If the user is detected drawing a leftward-directed short straight-line locus on the left-hand half of the screen, as indicated by reference character C3 in FIG. 15, the controller 33 switches content reproduction to slow-motion reverse reproduction. If the user is detected drawing a leftward-directed long straight-line locus on the left-hand half of the screen, as indicated by reference character C4 in FIG. 15, the controller 33 switches content reproduction to fast-reverse reproduction.

Where the above-described content reproduction switchovers are to be effected by performing relevant menu option operations, the control bar B1 would have to be used. However, the control bar B1 may not be on display because the menu option M28 may have been operated to turn off the control bar display. In that case, the control bar B1 needs to be displayed again before the menu options can be selected. By contrast, when the user draws the appropriate loci on the touch-sensitive panel 39 for input, the direction of each locus-drawing gesture is interpreted to mean forward or reverse reproduction, and the length of the locus is interpreted to signify the high or low speed of reproduction. The embodiment thus allows the user to specify the desired speed and direction of video content through the input of intuitively performed fingertip gestures on the touch-sensitive panel 39. This also contributes to improving the user's ease of operation.

Suppose that while content is being reproduced forward or in reverse at high or low speed on the video content display screen as described above, the user is detected applying pressure for at least a predetermined time period onto a fixed point on the touch-sensitive panel 39. In that case, the controller 33 switches content reproduction to normal reproduction. The embodiment thus allows the user to specify the desired display switchover through the input of an intuitively performed fingertip gesture onto the touch-sensitive panel 39. This contributes to enhancing the user's ease of operation.

By contrast, the user may be detected applying pressure for a predetermined time period or longer onto a fixed point on the touch-sensitive panel 39 while content is being reproduced normally. In this case, the controller 33 displays the menu screen shown in FIG. 12B.

Figure 16:
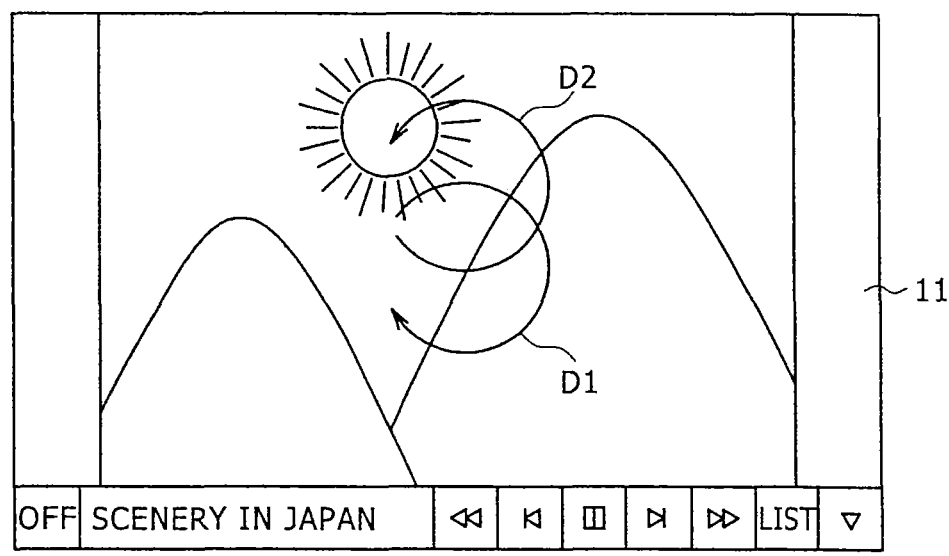
FIG. 16 is a plan view explaining how video content displays are switched when magnified or reduced in scale.

Suppose that with the video content display in effect, the user is detected drawing on the touch-sensitive panel 39 a clockwise circular arc locus as indicated by reference character D1 in FIG. 16. In this case, the controller 33 turns off display of the control bar B1 and causes the content image to appear magnified. If the user is detected thawing another clockwise circular arc locus on the touch-sensitive panel 39, the content image is shown magnified in such a manner that the horizontal direction of the content display turns into the horizontal direction of the display screen. Conversely, if the user is detected drawing a counterclockwise circular arc locus as indicated by reference character D2, the controller 33 gradually reduces the magnification of the image display in contrast to the case where clockwise circular loci are drawn.

The embodiment thus allows the user to specify the desired display switchover through the input of intuitively performed fingertip gestures onto the touch-sensitive panel 39. This further contributes to improving the user's ease of operation.

Suppose now that with the program menu screen in effect, the user has selected the menu option M1 for designating reception of TV broadcasts. In that case, as in the example described above with reference to FIGS. 12A and 12B, the content and control bar displays are made in keeping with the most-recent settings in the last-state memory. TV broadcast content items may also be switched as instructed by the user. In this case, the control bar gives menu options used to change channels up or down and to display a list of available content items based on an electronic program guide (EPG), along with a current content title. The available content items are listed on the basis of the electronic program guide acquired through the communication unit 34. During reception of TV broadcasts, the display screen is structured in the same manner as the above-described display screen for displaying video content. For that reason, TV broadcast reception is discussed below with reference to FIGS. 12A through 16 as needed.

In displaying TV broadcasts, the controller 33 displays the control bar on/off menu option in response to the user's operations on the touch-sensitive panel 39 or remote commander 40. Depending on the settings of the on/off menu option or on the menu operations performed on the menu screen, the controller 33 turns off the control bar display. The controller 33 may further change channels up or down or seek out receivable channels in accordance with the operations on the control bar.

Suppose that during TV broadcast reception, the user is detected drawing on the touch-sensitive panel 39 an upward-directed straight-line locus indicated by reference character A1 in FIG. 13. In this case, the controller 33 moves channels up. Conversely, if the user is detected drawing a downward-directed straight-line locus as indicated by reference character A2, then the controller 33 moves channels down. Alternatively, the user may draw a left-to-right straight-line locus crossing the middle of the screen as indicated by reference character B1, which may be interpreted as the instruction to change channels up. The user may also draw a right-to-left straight-line locus crossing the middle of the screen as indicated by reference character B2, which may be interpreted as the instruction to change channels down.

Where the above-described received channel switchover is to be effected by performing relevant menu option operations, the control bar B1 would have to be used. However, the control bar B1 may not be on display because it may have been turned off. In that case, the control bar B1 needs to be displayed again before the menu options can be selected. Alternatively, the user may draw the appropriate loci on the touch-sensitive panel 39 for input, thereby changing channels up or down for TV broadcast reception. The embodiment thus allows the user to specify the desired display switchover through the input of intuitively made fingertip gestures on the touch-sensitive panel 39. This also contributes to enhancing the user's ease of operation.

Suppose that on the received TV broadcast display screen, the user is detected drawing on the touch-sensitive panel 39 a rightward-directed short straight-line locus on the right-hand half of the screen, as indicated by reference character C1 in FIG. 15, or a rightward-directed long straight-line locus on the right-hand half of the screen, as indicated by reference character C2. In such cases, the controller 33 performs a channel seek process to capture receivable channels by moving channels up. Conversely, if the user is detected drawing a leftward-directed short straight-line locus on the left-hand half of the screen, as indicated by reference character C3 in FIG. 15, or a leftward-directed long straight-line locus on the left-hand half of the screen, as indicated by reference character C4, the controller 33 carries out the channel seek process to detect receivable channels by moving channels down.

Where the above-described channel seek process is to be designated and executed by performing relevant menu option operations, the control bar B1 would have to be used. However, the control bar B1 may not be on display because it may have been turned off. In that case, the control bar B1 needs to be displayed again before the menu options can be selected. Alternatively, the user may draw the appropriate loci on the touch-sensitive panel 39 for input, thereby changing channels up or down to seek for receivable TV broadcast channels. The embodiment thus allows the user to specify the desired display switchover through the input of intuitively made fingertip gestures on the touch-sensitive panel 39. This also adds to the user's ease of operation.

Figure 17:
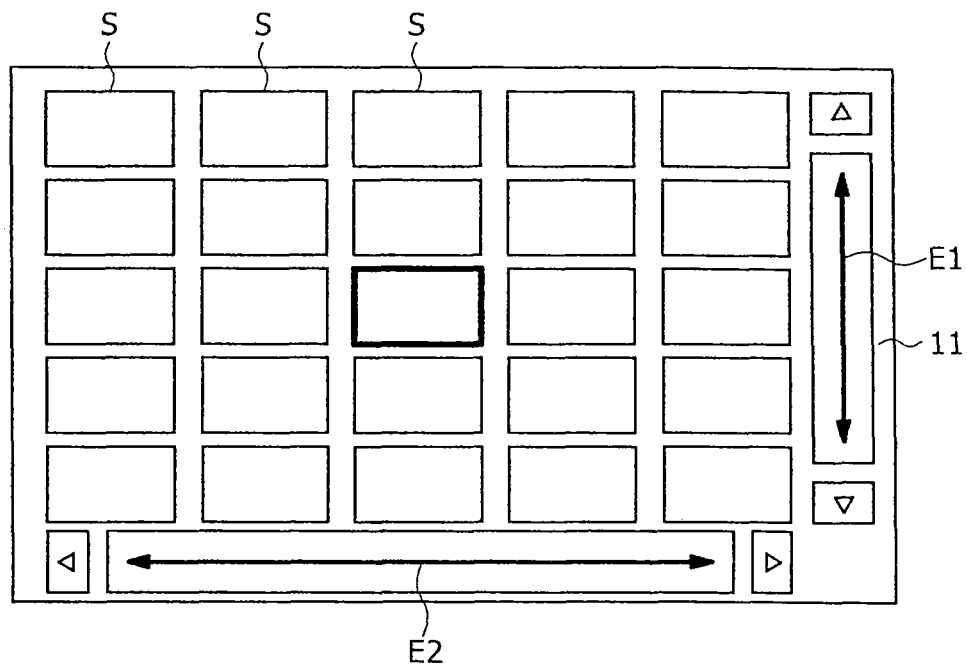
FIG. 17 is a plan view explaining how still image displays are switched.

When the menu option M8 for dealing with still images is selected on the program menu screen, the controller 33 displays thumbnail images S of still images in matrix as shown in FIG. 17. If there are too many still images to be accommodated in a single screen, the right-hand and bottom edges of the screen indicate scroll bars together with bar operation menu options.

On the thumbnail display screen, the controller 33 highlights the focused thumbnail image by bordering it with thick lines. When focus is switched from one thumbnail to another by the user operating the touch-sensitive panel 39 or remote commander 40, the controller 33 accepts the user's selection for focus change. Specifically, focus is changed when drag operations are detected on the scroll bars as indicated by reference characters E1 and E2. If not all thumbnail images S can be displayed within a single screen, then focus is switched from one image to another by scrolling the thumbnails in matrix. This arrangement makes it possible to select the desired still image easily and reliably. With the available screen size limited on the vehicle-mounted apparatus 1, a growing number of content items may not be contained within a single display at a time. In such a case, the ability to scroll thumbnail images as described above contributes to improving the user's ease of operation.

Figure 18:
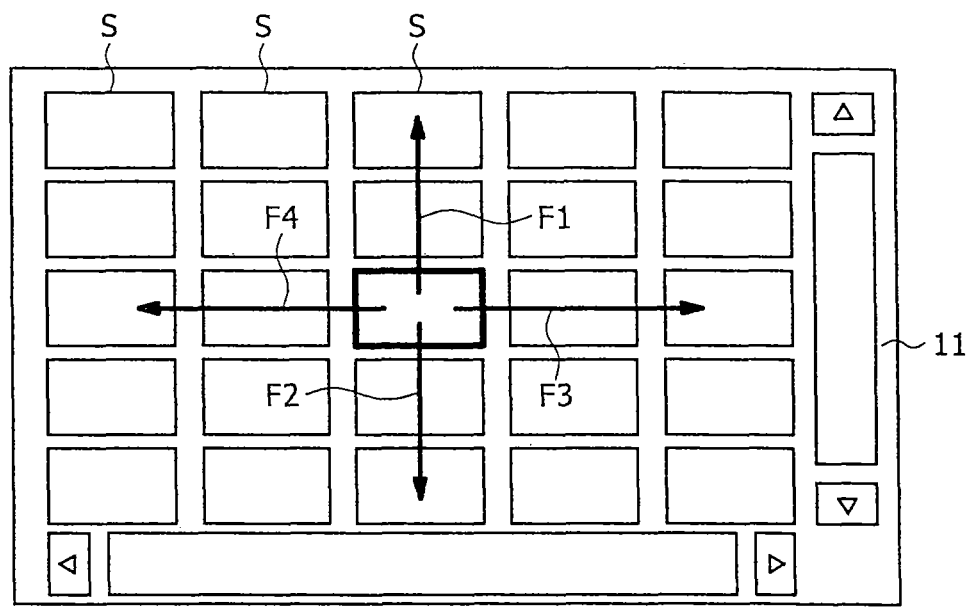
FIG. 18 is a plan view explaining how focuses are switched.

If the user is detected drawing on the touch-sensitive panel 39 an upward-directed straight-line locus as indicated by reference character F1 in FIG. 18, the controller 33 moves focus upward. If there are too many thumbnail images S to be included within a single screen, focus is moved upward by scrolling down the thumbnail images in matrix. Conversely, if the user is detected drawing on the touch-sensitive panel 39 a downward-directed straight-line locus as indicated by reference character F2, the controller 33 moves focus downward. If there are too many thumbnail images S to be included within a single screen, focus is moved downward by scrolling up the thumbnail images in matrix. If the user is detected drawing on the touch-sensitive panel 39 a rightward-directed or leftward-directed straight-line locus as indicated by reference characters F3 and F4, then the controller 33 moves the focus rightward or leftward. If there are too many thumbnail images S to be included within a single screen, focus is moved right or left by scrolling the thumbnail images in matrix in the crosswise direction.

Where the above-described focus change is to be effected by scrolling the display, the scroll bars may be used. Alternatively, the user may draw the appropriate loci on the touch-sensitive panel 39 for input, thereby changing the display in the desired directions. The embodiment thus allows the user to specify the desired display switchover through the input of intuitively made fingertip gestures on the touch-sensitive panel 39. This also contributes to improving the user's ease of operation.

When one of the displayed thumbnail images is selected as described above, the controller 33 displays the corresponding still image. Still photo display may be carried out using the control bar menu options displayed simultaneously, as in the example discussed above with reference to FIGS. 12A and 12B. For that reason, how still image display takes place is discussed below with reference to FIGS. 13, 15 and other figures in conjunction with FIGS. 12A and 12B. The controller 33 changes the photo being displayed in response to the user's control bar operations.

In the case above, if the user is detected drawing on the touch-sensitive panel 39 an upward-directed straight-line locus indicated by reference character A1 in FIG. 13, then the controller 33 calls up, as the object for display, the still image of a thumbnail image in a row above the thumbnail image of the currently displayed still image in the thumbnail image display in matrix. Conversely, if the user is detected drawing on the touch-sensitive panel 39 a downward-directed straight-line locus indicated by reference character A2 in FIG. 13, the controller 33 calls up as the object for display the still image of a thumbnail image in a row below the thumbnail image of the currently displayed still image in the thumbnail image display in matrix. If the user is detected drawing on the touch-sensitive panel 39 a rightward-directed or leftward-directed straight-line locus as indicated by reference characters C1 and C3 in FIG. 15, then the controller 33 calls up as the object for display the still image of a thumbnail image in a column to the right or left of the thumbnail image of the currently displayed still image in the thumbnail image display in matrix. If the user is detected drawing on the touch-sensitive panel 39 a clockwise or counterclockwise circular arc locus as indicated by reference characters D1 and D2 in FIG. 16, the controller 33 magnifies or reduces the still image being displayed.

Such display switchovers may also be accomplished by carrying out relevant control bar operations. However, if the control bar has been turned off, it needs to be displayed again before the menu options can be selected. By contrast, when the user draws the appropriate loci on the touch-sensitive panel 39 for input, the locus-drawing gestures are interpreted to mean the above-described display switchovers in different directions as well as display magnification and reduction. The embodiment thus allows the user to specify the desired display switchovers through the input of intuitively made fingertip gestures on the touch-sensitive panel 39. This also contributes to enhancing the user's ease of operation.

When the menu option M5 for reproducing content through the auxiliary input, the menu option M6 for starting up the browser for browsing websites on the Internet, or the menu option M7 for processing electronic mail is selected, the controller 33 displays the corresponding display screen along with the control bar. The controller 33 then accepts control bar operations by the user having selected the desired menu option.

In the case above, the user may also be detected drawing the loci indicated by reference characters C1 and C3 in FIG. 15 or the loci indicated by reference characters A1 and A2 in FIG. 13. The controller 33 then switches the displayed pages accordingly. When reading electronic mail or browsing websites, the user is thus allowed to enter intuitively made fingertip gestures through the touch-sensitive panel 39 to accomplish the display switchovers as envisaged by the user. This also adds to the user's ease of operation.

Figure 19:
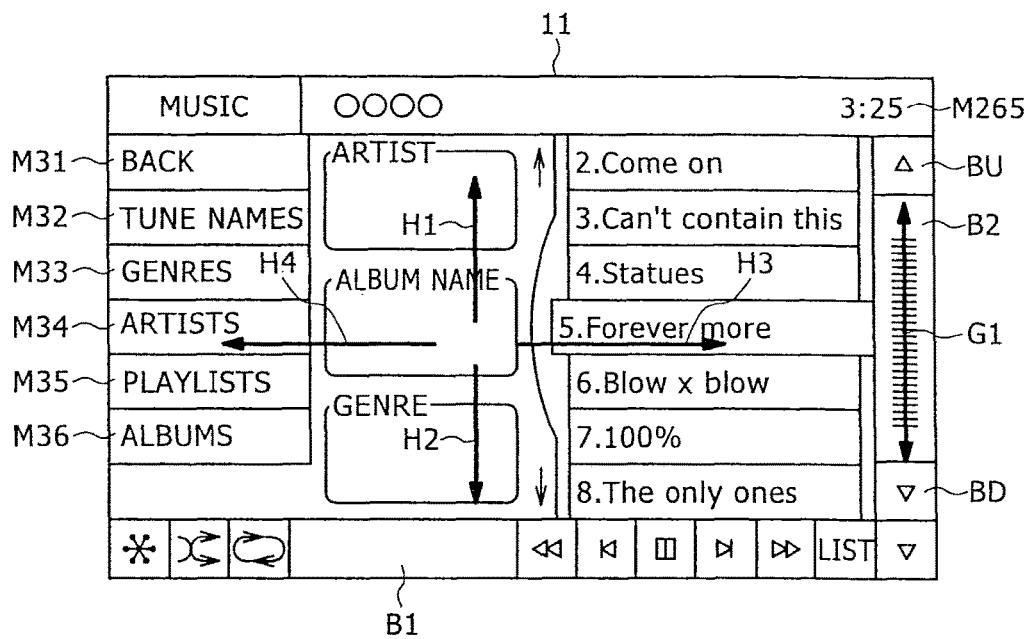
FIG. 19 is a plan view explaining how music content displays are switched.

If the user selects the menu option M3 for reproducing audio content, the controller 33 causes the display screen of FIG. 19 to appear. With this screen on display, the controller 33 retrieves and reproduces audio content from the hard disk drive 35 in keeping with the settings in the last-state memory for the user's enjoyment. In the belt-like region at the top of the display screen, the controller 33 displays the title of the audio content being provided to the user. On the left-hand side of the screen are a "back" menu option M31, a "tune names" menu option M32, a "genres" menu option M33, an "artists" menu option M34, a "playlists" menu option M35, and an "albums" menu option M36 arranged from the top down, in that order. The audio content items recorded on the hard disk drive 35 are categorized illustratively by tune name, genre, artist, play list, and album title. When the user selects any one of the menu options M32 through M36 corresponding to these categories, the controller 33 gives a list of the audio content items grouped by the user-specified attribute and available from the hard disk drive 35.

In the middle of the display screen are display fields related to artists, album titles, and other categories associated with the user's selection. Shown on the right-hand side area is a list of available content items in the currently selected category. If not all selectable content items can be accommodated in the list display area, the controller 33 allows the list display to scroll in the directions indicated by arrows to the left of the list. The example of FIG. 19 shows an upward arrow and a downward arrow, indicating that more content items are hidden from view outside the display area in the vertical direction. In this case, the controller 33 displays the scroll bar B2 to the right of the list display, as well as menu options BU and BD at the top and the bottom of the scroll bar B2 indicating the availability of upward and downward scrolls respectively. At the bottom of this list display, the control bar B1 appears. In the list thus displayed, the currently focused menu option is shown slightly projected to the left.

When the user operates the menu options M31 through M36 as well as the scroll bar B2 related to the list display, the controller 33 changes the content item being reproduced in accordance with the user's operations, as discussed above in connection with FIG. 12B.

At the bottom of the list screen, the control bar B1 is displayed. The control bar B1 shows in its leftmost position a "visualizer" menu option for changing moving-picture wallpapers in the "artists" display area. Immediately to the right of the "visualizer" menu option is a menu option for designating shuffle reproduction. On the right of the shuffle menu option is a "repeat reproduction" menu option. To the right-hand side on the control bar B1 are a "rewind" menu option, a "back to the preceding chapter" menu option, a "play/stop switchover" menu option, a "go to the next chapter" menu option, a "fast-forward" menu option, a "list display" menu option, and a "control bar on/off" menu option, laid out in that order from left to right.

Immediately after the display screen is turned on, the controller 33 displays a content list about the audio content items being provided to the user such as the title of the album in which the items in question are included. Upon display switchover, the controller 33 may switch focus from the current menu option on the control bar B1 to any of the menu options M31 through M36 as instructed by the user. If another menu option is selected by the user on the control bar B1, the controller 3 switches its mode to the corresponding operation.

If the user is detected drawing on the touch-sensitive panel 39 a drag operation on the scroll bar B2 as indicated by reference character G1, the controller 33 changes focus on the list screen accordingly. If not all items of the list can be included within a single screen, the controller 33 changes focus by allowing the list display to scroll.

If the user is detected drawing an upward-directed locus as indicated by reference character H1, the controller 33 calls up, as the object for display, the next album title, artist, or genre. Conversely, if the user is detected drawing a downward-directed locus as indicated by reference character H2, the controller 33 calls up as the object for display the immediately preceding album, artist, or genre. If a rightward-directed locus is detected as indicated by reference character H3, the controller 33 calls up the next tune as the object for reproduction. Conversely, if a leftward-directed locus is detected as indicated by reference character H4, the controller 33 calls up the immediately receding tune as the object for reproduction.

Such audio content switchovers may be accomplished by the user drawing on the touch-sensitive panel 39 fingertip gestures intuitively for input. This also contributes to improving the user's ease of operation.

Where the fingertip gestures above are to be accepted as input by the controller 33, different users are expected to draw the loci in different ways. In such cases, the controller 33 prompts the user to select the tutorial menu option by keeping track of the hierarchically structured menu operations on the menu screen discussed above in connection with FIG. 13 and other figures. With the tutorial display screen of FIG. 20 displayed, the controller 33 guides the user in the fingertip drawing of acceptable loci.

At the top of the tutorial display screen is a belt-shaped region indicating the title of the display screen to the left. To the right of the title are a menu option MT1 for application program switchover in connection with the tutorial and a menu option MT2 for ending the tutorial. When the menu option MT1 is operated repeatedly, the controller 33 switches cyclically the application programs corresponding to the menu options M1 through M8 on the program menu screen. When the menu option MT2 is operated, the controller 33 terminates the tutorial.

Figure 20:
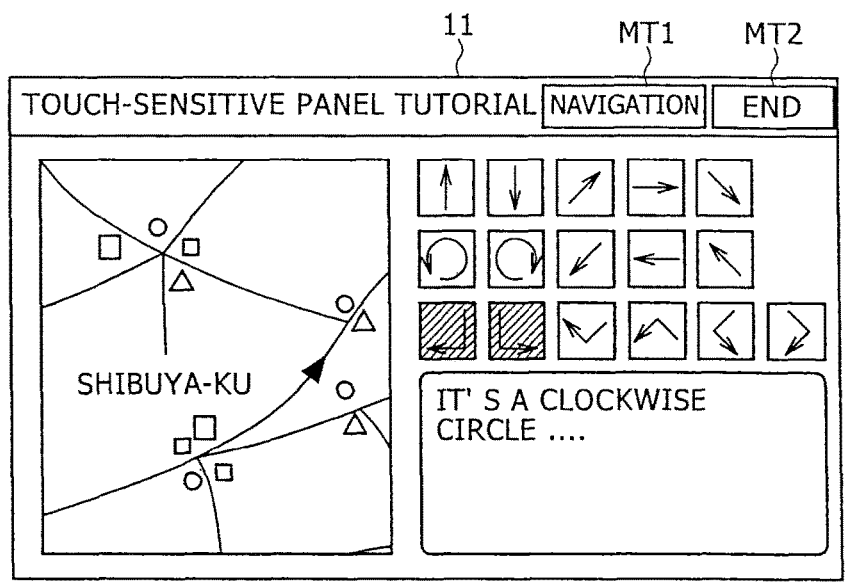
FIG. 20 is a plan view showing a tutorial screen.

The area under the belt-shaped region at the top of the display screen is split into a left-hand and a right-hand half. The left-hand side area is a tutorial input area. The right-hand side area is divided into an upper and a lower half. The upper-half area displays diverse loci which, when drawn on the touch-sensitive panel 39, are recognized by the vehicle-mounted apparatus 1. Of the displayed loci, those not recognized by the tutorial application program are shown at a reduced level of brightness. The example of FIG. 20 shows that a total of 16 loci can be recognized by the vehicle-mounted apparatus 1. The example also shows that 14 loci are recognized by the map display application program that takes over from the tutorial application program. On the display screen, the user may select any one of these loci. When one of the loci is selected, the lower-half area of the screen explains in text form what is input by the selected locus. While the example of FIG. 20 shows 16 loci, the display screen obviously accepts the above-described rectangular locus as well.

On the tutorial display screen, the controller 33 accepts the user's input through the tutorial input area. Given such input, the controller 33 switches displays in the input area. This embodiment thus allows the user to verify how input is made through fingertip gestures.

(2) Operation of the Embodiment

When the vehicle-mounted apparatus 1 of the above-described structure (shown in FIGS. 1 and 2) is attached to the onboard cradle 2A installed inside the vehicle, the apparatus 1 is powered from the power source of the vehicle. Via the onboard cradle 2A, the vehicle-mounted apparatus 1 is connected to the external unit 21 and car audio equipment 28 set up in the vehicle interior. The setup renders the apparatus 1 usable by passengers of the vehicle. Operating the power switch 12 turns on the vehicle-mounted apparatus 1. The apparatus 1 then functions as a car navigation device, as a content providing device which reproduces audio and video content from the hard disk drive 35 or displays TV broadcasts, or as a GPS unit that informs the user of the current geographical position of the vehicle.

The vehicle-mounted apparatus 1 used for content reproduction, current position verification and other purposes may be operated using the remote commander 40 or the touch-sensitive panel 39 on the display screen. The user's appropriate operations cause the program menu screen (FIG. 3) to appear together with menu options for selecting available applications. Selecting one of the menu options on the program menu screen starts up a desired application program such as one for enjoying TV broadcast content. It is also possible to activate a plurality of applications so that the user may illustratively get a map displayed and verify the current position of the vehicle while listening to music.

When applications are selected as described, the main screen of each application displays the menu options for calling up the list screen for content selection or content reproduction and other features. Any of these menu options may be selected for content switchover and other operations by the user operating the touch-sensitive panel 39 or the remote commander 40.

However, such menu screen operations are necessarily complicated because they require the user to get the menu screen displayed and to select desired menu options. When multifunctional equipment such as the vehicle-mounted apparatus 1 is in use, the number of menu option layers involved tends to grow. The increased number of added operations resulting from the boosted functionality detracts from the user's ease of operation. Even without a noticeable increase in the number of menu option layers, growing functions entail a larger number of menu options working against the user's ease in selecting some of them. In particular, vehicle-mounted apparatus needs to be operated precisely in a limited time period such as during a temporary stop at traffic lights. Growing complexities of onboard device operation can be detrimental to safe driving.

Such potential flaws are circumvented by this embodiment that lets the user change displays alternatively using fingertip gestures on the touch-sensitive panel. A single gesture can get a menu screen displayed or have menu options switched on that menu screen. This is a significant contribution to easing the user's inconvenience in having to memorize or actually go through complicated operating procedures. Since there is no need to display each and every menu screen, the necessity of verifying elaborate display screens is safely averted, whereby the user's ease of operation is increased. The improved ease of use of the vehicle-mounted apparatus translates into safer driving and provides passengers with a comfortable car interior environment.

When these fingertip gestures are set to effect display switchovers as envisaged by the user, the user with little familiarity with intricate operations of the vehicle-mounted apparatus is able to switch displays on the apparatus easily and unfailingly.

More specifically, when getting a child screen displayed, the user draws on the touch-sensitive panel 39 a rectangle-shaped locus similar to the contour of the desired child screen. The vehicle-mounted apparatus then proceeds to form the child screen based on the user-drawn locus for display switchover (FIGS. 8A and 8B). The apparatus may also provide a 2-D display, a 3-D display or a split-window display (FIGS. 9A, 9B1, 9B2 and 9C; FIGS. 11A, 11B and 11C) as envisaged and instructed by the user, whereby the user's easy of operation is enhanced.

When discontinuing the child screen display or switching what is displayed between the child and the parent screens, the user draws on the touch-sensitive panel 39 a locus for moving the unnecessary window out of the screen or a locus for moving one window into the other. These fingertip gestures bring about the display switchover (FIGS. 8B and 8C) or changing of the viewpoint (FIGS. 10A, 10B and 10C) as envisaged by the user, whereby the user's ease of operation is improved.

Where content is being provided on the screen, the user may draw on the touch-sensitive panel 39 suitable loci in the upward, downward, rightward, or leftward direction for switching the speed and direction of reproduction as well as for changing the content item being provided to the user (FIGS. 13 through 19), whereby the user's ease of operation is further boosted.

Suitable fingertip gestures input by the user are also accepted to call up the tutorial screen (FIG. 20). This is a screen that allows the novice user to gain knowledge of apparatus operations with ease. This is another ease-of-use feature for the user's benefit.

It is to be understood that while the invention has been described in conjunction with a specific embodiment with reference to the accompanying drawings, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

What is claimed is:

1. An electronic device comprising:
   a display;
   a touch sensor disposed on, under or formed integrally with the display and configured to detect gestures in a plane of the touch sensor; and
   circuitry configured to
   switch from (1) displaying, on the display, a first screen of a first application as a parent screen and displaying a second screen of a second application as a child screen, to (2) displaying, on the display, the first screen as the child screen and displaying the second screen of the second application as the parent screen, in response to receiving a substantially straight line gesture input in the plane of the touch sensor, the substantially straight line gesture either (i) starting from inside the second screen of the second application displayed as the child screen and moving into the first screen of the first application displayed as the parent screen, or (ii) starting from inside the first screen displayed as the parent screen and moving into the second screen of the second application displayed as the child screen.

2. The electronic device of claim 1, wherein the circuitry is configured to:
   execute a photo application; and
   cause the display to display a photo image based on still image data.

3. The electronic device of claim 2, wherein
   the circuitry is configured to output an audio signal based on music content data when executing a music application.

4. The electronic device of claim 3, wherein
   the display screen of the music application includes an index of music content data.

5. The electronic device of claim 4, wherein
   the circuitry is configured to execute a process in response to receiving a second substantially straight line gesture input in the plane of the touch sensor when an image corresponding to another application program, which is different from the first application and second application, is displayed on the display.

6. The electronic device of claim 5, wherein
   the another application program is a photo application.

7. The electronic device of claim 6, wherein
   the process is a process of switching between photo images displayed on the display.

8. The electronic device of claim 2, further comprising:
   an interface configured to communicate with a memory card removably attached to the interface, wherein
   the circuitry is configured to control recording the still image data from the memory card via the interface.

9. The electronic device of claim 5, wherein
   the process is executed when a gesture is received at a position of the display that displays the photo image.

10. The electronic device of claim 1, wherein
    the touch sensor is configured to detect gestures made by a finger of a user.

11. The electronic device of claim 1, wherein
    the substantially straight line gesture is a touch gesture in which the substantially straight line is drawn by a finger of a user.

12. The electronic device of claim 1, wherein the circuitry is configured to:
    cause displaying a predetermined menu item; and
    cause switching to a previously displayed screen in response to an input operation selecting the predetermined menu item.

13. The electronic device of claim 1, further comprising:
    an interface configured to connect to an external device and receive electric power and data via the interface.

14. The electronic device of claim 1, further comprising:
    an interface configured to communicate with a memory card removably attached to the interface.

15. The electronic device of claim 1, wherein
    the circuitry is configured to receive a broadcast television signal and cause reproducing content based on the received broadcast television signal.

16. The electronic device of claim 1, wherein
    the circuitry is configured to receive an instruction from a device remote from the electronic device corresponding to an input operation received at the device remote from the electronic device to control an operation of the electronic device.

17. The electronic device of claim 1, further comprising:
    a wireless local area network (LAN) interface, wherein
    the circuitry is configured to control transmission and reception of data via the wireless LAN interface.

18. The electronic device of claim 1, wherein
the circuitry is configured to identify a position of the electronic device based on received Global Positioning Satellite (GPS) signals.

19. The electronic device of claim 1, wherein
the circuitry is configured to receive traffic information and cause the display to display information corresponding to the received traffic information.

20. The electronic device of claim 1, further comprising:
an interface configured to communicate with a television, wherein
the circuitry is configured to cause data to be transmitted to the television via the interface.

21. The electronic device of claim 1, further comprising:
an interface configured to connect to a vehicle, wherein
the circuitry is configured to cause data to be transmitted to the vehicle via the interface.

22. The electronic device of claim 1, wherein
the substantially straight line gesture is a horizontal substantially straight line gesture.

23. The electronic device of claim 1, wherein
the child screen is displayed inside the parent screen, and
the child screen occupies only a part of an entire area of the parent screen.

24. A method performed by an electronic device, the method comprising:
switching, by circuitry, from (1) displaying, on a display, a first screen of a first application as a parent screen and displaying a second screen of a second application as a child screen, to (2) displaying, on the display, the first screen as the child screen and displaying the second screen of the second application as the parent screen, in response to receiving a substantially straight line gesture input in a plane of a touch sensor, the substantially straight line gesture either (i) starting from inside the second screen of the second application displayed as the child screen and moving into the first screen of the first application displayed as the parent screen, or (ii) starting from inside the first screen displayed as the parent screen and moving into the second screen of the second application displayed as the child screen.

25. A non-transitory computer-readable medium including computer program instructions, which when executed by an electronic device having a touch sensor and circuitry, cause the electronic device to:
switch from (1) displaying, on a display, a first screen of a first application as a parent screen and displaying a second screen of a second application as a child screen, to (2) displaying, on the display, the first screen as the child screen and displaying the second screen of the second application as the parent screen, in response to receiving a substantially straight line gesture input in a plane of the touch sensor, the substantially straight line gesture either (i) starting from inside the second screen of the second application displayed as the child screen and moving into the first screen of the first application displayed as the parent screen, or (ii) starting from inside the first screen displayed as the parent screen and moving into the second screen of the second application displayed as the child screen.

* * * * *